US008261715B2

(12) United States Patent
Samuels

(10) Patent No.: US 8,261,715 B2
(45) Date of Patent: Sep. 11, 2012

(54) COMBINATION PISTON AND VARIABLE BLADE TURBINE INTERNAL COMBUSTION ENGINE

(76) Inventor: Samuel Lee Samuels, Bloomfield, NJ (US)

( * ) Notice: Subject to any disclaimer, the term of this patent is extended or adjusted under 35 U.S.C. 154(b) by 529 days.

(21) Appl. No.: 12/552,833

(22) Filed: Sep. 2, 2009

(65) Prior Publication Data

US 2011/0048369 A1   Mar. 3, 2011

(51) Int. Cl.
*F02B 53/04* (2006.01)
*F02B 53/00* (2006.01)
*F02G 3/00* (2006.01)

(52) U.S. Cl. ........ 123/223; 123/227; 123/241; 123/243; 60/614

(58) Field of Classification Search .............. 60/614, 60/623; 123/241, 243, 244, 237, 227, 223, 123/48 B, 197.4
See application file for complete search history.

(56) References Cited

U.S. PATENT DOCUMENTS

| | | | | |
|---|---|---|---|---|
| 1,048,308 A * | 12/1912 | Hanley | | 123/241 |
| 1,349,353 A * | 8/1920 | Wilber, Jr. | | 123/227 |
| 1,368,359 A * | 2/1921 | Scott | | 123/223 |
| 1,400,255 A * | 12/1921 | Anderson | | 123/241 |
| 1,825,791 A * | 10/1931 | Haynes | | 123/223 |
| 1,891,321 A * | 12/1932 | Woolson | | 123/48 B |
| 3,405,692 A * | 10/1968 | Paschke | | 123/213 |
| 3,677,235 A * | 7/1972 | Adkins | | 123/227 |
| 3,793,998 A * | 2/1974 | Yokoi et al. | | 123/43 R |
| 3,993,029 A * | 11/1976 | Eiermann et al. | | 123/203 |
| 4,843,821 A * | 7/1989 | Paul et al. | | 60/605.1 |
| 4,860,704 A * | 8/1989 | Slaughter | | 123/237 |
| 5,531,197 A * | 7/1996 | Lobb | | 123/243 |
| 5,806,315 A * | 9/1998 | Mui | | 60/614 |
| 7,270,092 B2 * | 9/2007 | Hefley et al. | | 123/48 B |
| 7,308,884 B2 * | 12/2007 | Tathuzaki et al. | | 123/241 |
| 7,338,267 B2 * | 3/2008 | Patterson | | 418/268 |
| 8,056,527 B2 * | 11/2011 | De Oliveira | | 123/223 |

* cited by examiner

*Primary Examiner* — Thai Ba Trieu
(74) *Attorney, Agent, or Firm* — Notaro, Michalos & Zaccaria P.C.

(57) ABSTRACT

Internal combustion engine has intake with compression in piston/cylinders and combustion and exhaust in a turbine. Turbine assembly includes a rotor connected to an output shaft and has variable blades pivotally mounted to rotor. The output shaft is connected to a crankshaft that is connects to the pistons to synchronizes intake and compression with combustion and exhaust. While the rotor spins centrifugal force causes the blades to swivel outwardly. The blades swivel inboard of the rotor as the space between them and the turbine housing cam contour gradually decreases. After partial compression, air enters the turbine assembly's combustion and exhaust chamber. Once full compression is attained, combustion takes place initiating a power cycle causing the turbine to rotate. When the power cycle is completed, the inner cam contour forces the blades inboard and exhaust is cleared by the subsequent variable blade, facilitating the next combustion and exhaust cycle.

25 Claims, 14 Drawing Sheets

COMBINATION PISTON AND VARIABLE BLADE TURBINE INTERNAL COMBUSTION ENGINE

FIELD AND BACKGROUND OF THE INVENTION

The present invention relates generally to the field of internal combustion engines and in particular to an engine in which air intake and compression take place in the chambers of at least two piston-cylinder assemblies and combustion and exhaust take place in the chambers of a turbine assembly.

Rotary engines with pistons pivotally mounted on a rotating rotor have been in the engine art for some time. For example, U.S. Pat. No. 1,349,353 to Wilber discloses a rotary engine and a lever arm fixed thereon having a roller upon its end. At the same end of the motor and around a shaft is hung a cam having raised portions upon its surface, upon which the roller of the lever arm is made to bear. As the roller is moved over the cam, the hinged pistons are moved completely into the combustion chambers at the time the rollers reach the summit of the raised portions of the cams, and are permitted to move out again as the roller drops or moves off the raised portion of the cam. The roller upon the lever arm fixed to the shaft to which the piston is rigidly secured, moves up an inclined surface of the cam face thereby rocking the corresponding piston out of its recess.

Another example is U.S. Pat. No. 3,993,029 to Eiermann et al. which discloses a compound supercharged rotary piston engine device in which a rotary piston compressor is interposed between a pair of rotary piston engines to form a unit. A single shaft extends through the unit and has coaxial eccentrics for the engines and an eccentric displaced 180 degrees therefrom for the compressor. The compressor supplies primary combustion air to the engines and also supplies air thereto for after an burning uncombusted fuel entrained in the exhaust gases of the engines. The air supply from the compressor to the engines takes place in a set of passages in the walls which separate the compressor from the engines and the passages are under the control of the pistons of the device. Also see U.S. Pat. No. 1,048,308 to Hanley and U.S. Pat. No. 1,400,255 to Anderson.

Through the years other U.S. patents have been issued for improvements and changes to the original rotary engine concept.

For example, U.S. Pat. No. 5,531,197 to Lobb discloses a rotary internal combustion engine that includes a block having a generally elliptically shaped bore and a substantially round rotor adapted to rotate on a straight shaft in the bore of the block. The rotor is provided with a pair of substantially diametrically mounted rotor segments, the rotor being provided with a pair of recesses for receiving the rotor segments and the rotor segments being pivotally mounted to the rotor such that a portion of each rotor segment tends to be forced outwardly by centrifugal force upon the rotation of the rotor. The block is provided with a charging and a combustion space formed in the space between the elliptical shaped bore and the round rotor. The combustion chamber is enlarged by the outward movement of an outer segment pivotally mounted on the block. A pair of vanes between the rotor segments are mounted in slots on the rotor for the forming of a seal between the rotor and the inner surface of the bore of the block. The engine may be operated on any type of gaseous fuel. The narrowing of the space between the round rotor and elliptically shaped bore functions to compress the air/fuel mixture enclosed between the vane and the rotor segment. The engine provides two combustions per revolution. Larger engines may be constructed coupling any number of rotors and blocks either in line or side by side with the rotors coupled together. A variable displacement engine is provided by varying the size of the combustion chamber by limiting the outward movement of the outer segment.

Another example of an improved rotary internal combustion engine is shown is U.S. Pat. No. 4,843,821 to Paul et al. which discloses a compound rotary-reciprocal engine with multiple cylinders of a reciprocator component coupled to a positive displacement, rotary compressor-expander, with systems for coordinating the cycle timing of each cylinder with the timing of the rotary compress or expander and with systems enabling the efficient operation of the coupled components as a unitary engine in a wide range of operating conditions.

However, the above mentioned prior art references all suffer from significant drawbacks. Firstly, in the prior art references, and especially in Wilber, the engines rely on springs and mechanical means to open the variable blades and they do not make proper use of centrifugal force. Instead their design employs elaborate mechanisms to move the pistons outward. For example, Wilber relies on cams and rollers to move the pistons outward. Thus, they can not achieve high revolutions per minute (RPMs), which is an important limiting factor. Making proper use of centrifugal force is critical to achieving high RPMs and without high RPMs there can be no power output of significance.

Additionally, in Wilber as well as the other prior art engines, the blades have a "pocket" shape and generally cam shape, which limits the length of the power stroke, and as well as the RPMs. Additionally, the compression schemes. Furthermore, the above mentioned references do not compress the air which is used ion the combustion process in separate piston chambers which also limits the RPMs which they can achieve.

Accordingly there is a need for an engine which can employ a simple design that can both make proper use of centrifugal force and thus achieve high RPMs, as well as overcome the other drawbacks associated with the disclosed prior art engines.

SUMMARY OF THE INVENTION

Accordingly, it is an object of the present invention to provide an internal combustion engine which makes proper use of centrifugal force and does not rely on elaborate mechanical means to open its blades.

Another object of the present invention is to provide an internal combustion engine which employs a cam shape, that can achieve high RPMs as well as a long combustion stroke cycle.

It is a further object of the present invention to provide an internal combustion engine with a different compression scheme.

Still another object of the present invention is to provide an internal combustion engine in which partial combustion occurs in at least one piston cylinder and in which combustion occurs in the turbine while the turbine is spinning at high RPMs.

Yet another object of the present invention is to provide a internal combustion engine which synchronizes the power output shaft, crankshaft and piston assemblies with full compression then combustion and exhaust in a variable blade turbine assembly.

The present invention accomplishes the aforementioned objectives and improves the efficiency of the internal combustion engine, by changing the geometry of the conventional four stroke engine. Like many conventional engines, the engine of the present invention has four strokes. However, the present invention performs two of its strokes, i.e., the air intake stroke and partial compression stroke, in intake and compression chambers of at least two piston-cylinder assemblies. Full compression as well as the power stroke and the exhaust stroke, take place in a separate combustion and exhaust chamber contained within a variable blade turbine assembly.

A preferred internal combustion engine according to the present invention has a variable blade turbine assembly which has a front side, a back side and a hollow stationary turbine housing which has a peripheral interior surface. A cylindrical rotor is rotatably fixed inside the turbine housing and has a rotational axis at its center as well as a first side and an opposite second side. Additionally, the rotor has an outer seal surface which comes in contact with the interior surface of the turbine housing. It also has a first blade shaped notch positioned on one of its sides and on the other opposite side it has a second blade shaped notch.

Furthermore, a variable turbine blade is pivotably attached to one side of the rotor so that the blade can swivel both inboard of the rotor into the first blade shaped notch as well as outboard of the rotor in response to centrifugal forces created by rotation of the rotor. On the other side of the rotor is another variable turbine blade which is attached to the rotor in the same way and functions in the same way as the first variable blade.

The turbine housing further includes two equally spaced apart gas tight junctions where the outer seal surface of the rotor abuts its peripheral interior surface. In between the two gas tight junctions are combustion and exhaust chambers in which the combustion and exhaust strokes take place. These chambers are defined by the peripheral interior surface of the turbine housing, the outer seal surface of the rotor and the first and second variable turbine blades.

In addition, the turbine housing also comprises a front turbine compression port through which partially compressed air enters the turbine assembly. The front turbine compression port is located immediately downstream in the direction which the rotor is spinning of the first gas tight junction and it has a back end as well as a outlet opposite its back end which opens into the combustion and exhaust chambers. The turbine housing also has a back turbine compression port through which partially compressed air enters the turbine assembly which is located immediately downstream from the second gas tight junction. It also has a back end and an outlet at its front end through which the compressed air enters the combustion chambers.

The turbine housing has a first transition point on its peripheral interior surface positioned immediately downstream from the outlet of the front turbine compression port. Also, positioned immediately downstream from the outlet of the back turbine compression port is a second transition point on the peripheral interior surface of the turbine housing. Immediately downstream of the front turbine compression port's outlet is a front fuel injector for injecting fuel into, and creating a fuel air mixture in the combustion and exhaust chambers. Similarly there is a back fuel injector located downstream from the outlet of the back turbine compression port.

Furthermore, the turbine housing also has a front spark plug positioned at the back end of the front turbine compression port and a back spark plug positioned at the back end of the back turbine compression port. Moreover, located just upstream from the second gas tight junction is a first exhaust port through which exhaust gases leave the turbine assembly. Similarly, a second exhaust port is provided upstream of the first gas tight junction.

Finally, the shape of the interior of the turbine housing creates a cam contour for forcing the first and second variable blades inboard of the rotor as the rotor spins. The turbine housing cam contour is formed by the interior surface of the turbine housing and is located between the first and second gas tight junctions. Additionally, the turbine housing cam contour has a radius from the rotor's axis of rotation (A) which is greatest at the center of the combustion and exhaust chambers and which gradually tappers off toward the first gas tight junction (J1) and the second gas tight junction J2.

A preferred internal combustion engine according to the present invention also includes at least one front piston-cylinder assembly for performing the intake and partial compression strokes and which then feeds the compressed air to the turbine assembly. The front piston-cylinder assembly has a front piston housing, connected to the front side of stationary turbine housing of the variable blade turbine assembly. Additionally, it has a front intake and compression chamber which has a top end. At the top end of the intake and compression chamber and adjacent to the turbine housing is provided a front compression transfer port for transferring partially compressed air to the turbine assembly. The front compression transfer port is in line with the front turbine compression port and a front compression transfer valve is provided for opening and closing the front compression transfer port.

The front piston-cylinder assembly also includes a front air intake and compression piston which has a bottom surface and is slidably positioned within the front intake and compression chamber, a front connecting rod connected to the bottom surface of the front air intake and compression piston, a front air intake port located at the top end of the front intake and compression chamber through which air is drawn into the front intake and compression chamber, and a front air intake valve for opening and closing the front air intake port.

A preferred internal combustion engine according to the present invention also includes at least one back piston-cylinder assembly connected to the back side of the turbine assembly. Besides its location on the opposite side of the turbine housing, the back piston-cylinder assembly is identical in structure and function to the front piston-cylinder assembly.

A preferred internal combustion engine according to the present invention further includes an output shaft for generating power from rotation of the rotor. The output shaft is rotatably supported by and extends through the back side of the turbine housing. It is fixed to the rotor so that the rotor and the output shaft rotate at the same rate.

A preferred internal combustion engine according to the present invention also has a crankshaft which controls the movement of the front and back intake and compression pistons. The crankshaft is pivotably connected to the connecting rod of the front piston-cylinder assembly by a first crankpin. Similarly, the crankshaft is pivotably connected to the connecting rod of the back piston-cylinder assembly by a second crankpin.

Also included in a preferred embodiment of the present invention are means for synchronizing and mechanically connecting the output shaft to the crankshaft. This component is for transferring rotational power from the output shaft to the crankshaft and it is configured so that the intake, partial compression as well as the full compression, combustion and exhaust strokes are properly timed.

A preferred embodiment of the present invention also includes a first camshaft having a front compression cam lobe which is located above the front compression transfer valve and which controls the opening and closing of the front compression transfer valve, as well as a front intake cam lobe which is located above the front air intake valve and which controls the opening and closing of the front air intake valve. Also included in a preferred embodiment of the present invention is a second camshaft having a back compression cam lobe which is located above the back compression transfer valve and which is for controlling the opening and closing of the back compression transfer valve as well as and a back intake cam lobe which is located above the back air intake valve and which controls the opening and closing of the back air intake valve.

Finally, a preferred embodiment of an engine according to the present invention includes a means for mechanically connecting and synchronizing both the first and second camshafts to the output shaft. These components transfer rotational power from the output shaft to the first and second camshafts and are configured so the opening and closing of the respective air intake and compression transfer valves is timed properly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The present invention relates to an internal combustion engine in which an air intake stroke and a partial air compression stroke occur in at least two piston assemblies and in which full compression as well as the power stroke and the exhaust stroke occur in a separate adjacent turbine assembly.

Figure 1:
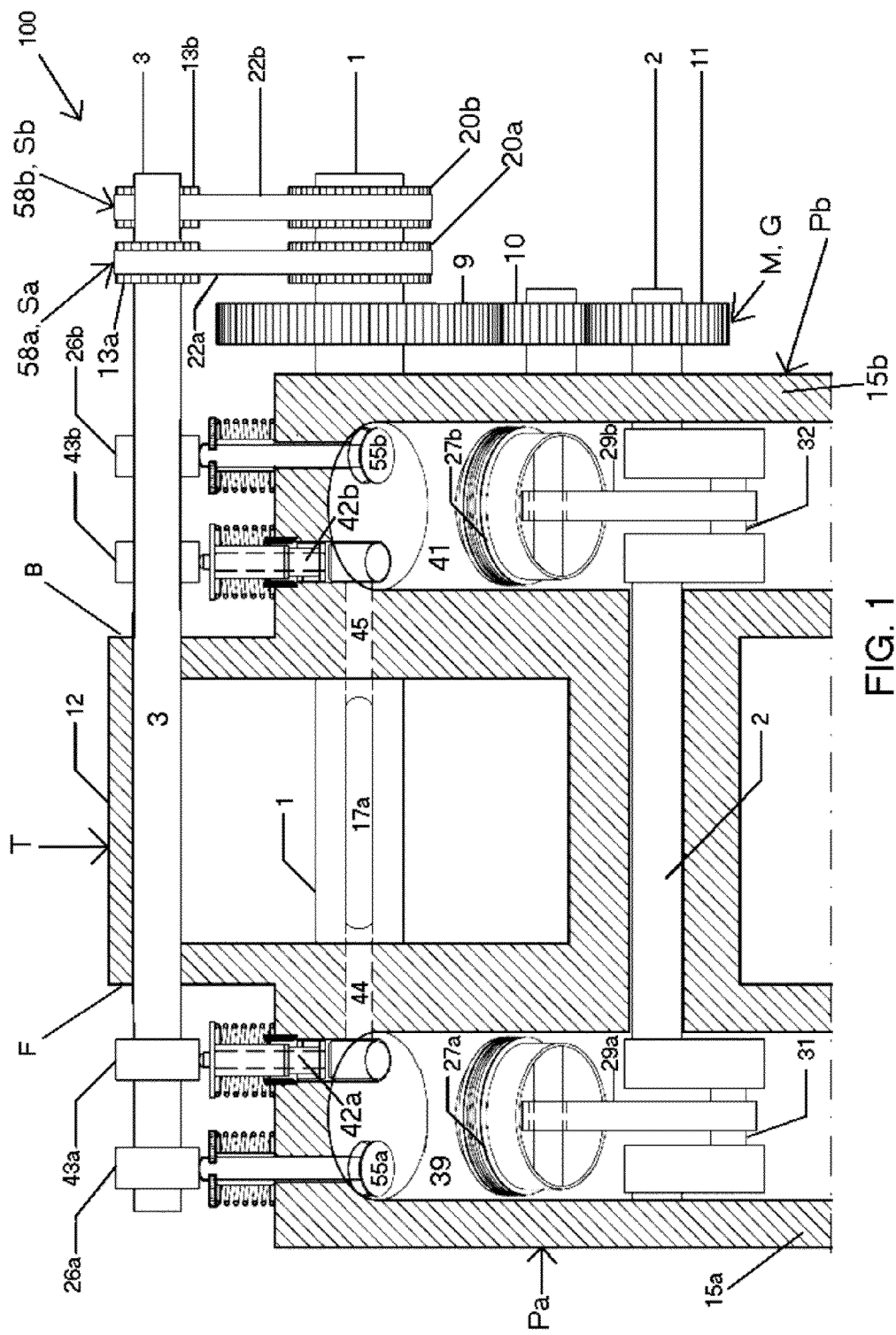
FIG. 1 is a longitudinal cross section of the general assembly of a variable blade turbine internal combustion engine according to an embodiment of the present invention showing the spacial relationship of the major components with the rotor missing.
Figure 2:
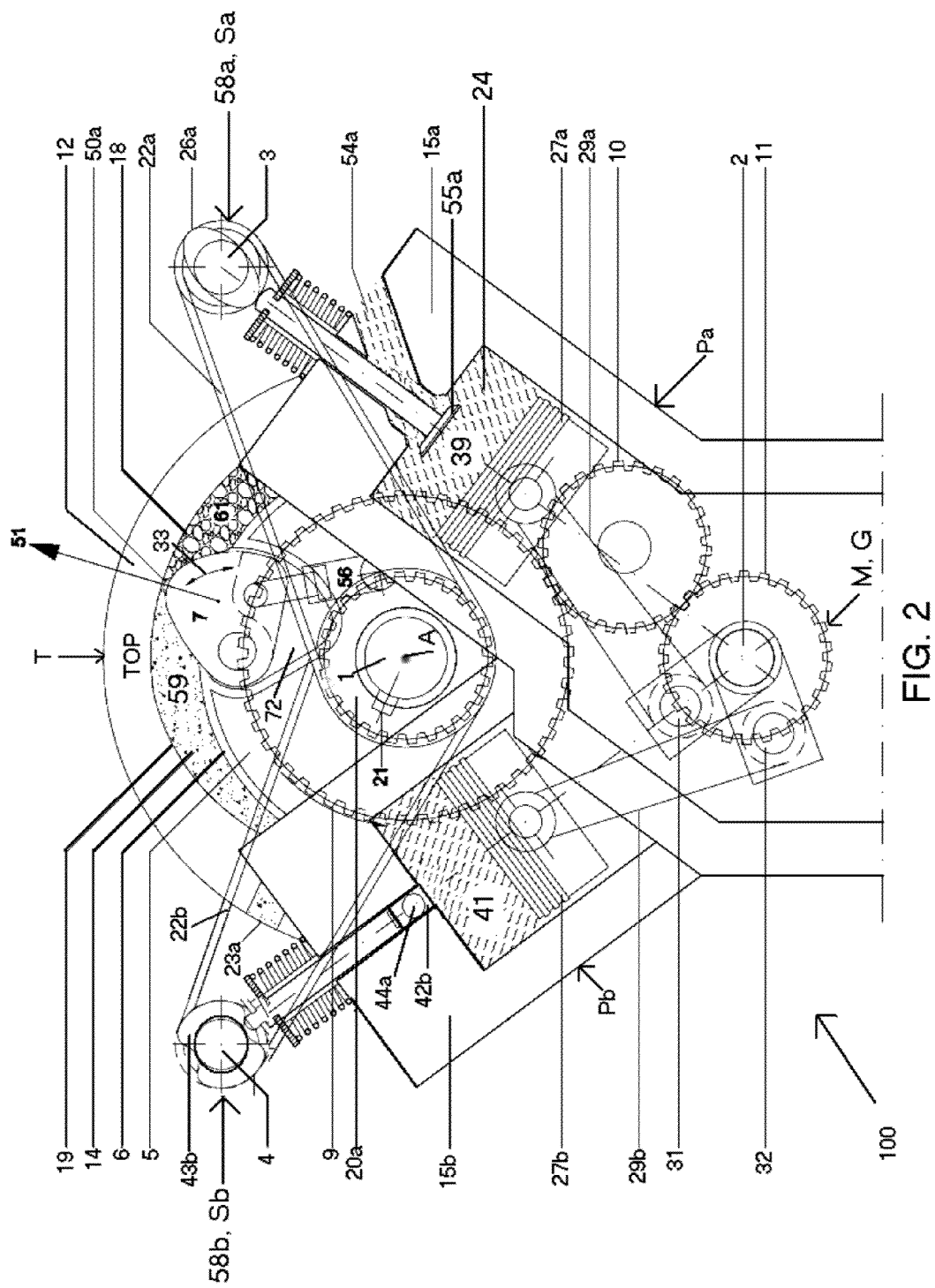
FIG. 2 is a schematic view of a variable blade turbine internal combustion engine according to an embodiment of the present invention which shows a cross section of the front piston-cylinder assembly and a partial cross section of both the back piston-cylinder assembly and the variable blade turbine assembly ("turbine assembly"), also showing the back piston-cylinder assembly, the geartrain, the means for connecting and synchronizing the output shaft with the first camshaft as well as the means for connecting and synchronizing the output shaft with the second camshaft in front of the turbine assembly, further showing the air intake port and air intake valve of the front piston-cylinder assembly.

Referring now to the drawings, in which like reference numerals are used to refer to the same or similar elements, FIG. 1 shows a longitudinal cross section of the general assembly of a variable blade turbine internal combustion engine 100, according to an embodiment of the present invention.

the main components of the present invention as illustrated in FIGS. 1 and 2, include a variable blade turbine assembly T ("turbine assembly") which converts the energy created by combustion in its chambers 14 into rotational energy; an output shaft 1 which transfers rotational energy out of the turbine assembly T for use both outside and in other parts of the engine; a front piston-cylinder assembly Pa and a back piston-cylinder assembly Pb which perform air intake as well as partial air compression strokes and then transfer partially compressed air to the turbine assembly T for use in the combustion process.

Other main components of the present invention are a crankshaft 2 which drives the intake and compression pistons 27a, 27b; a means for mechanically connecting and synchronizing the output shaft 1 with the crankshaft 2 which is indicated by reference character M and is accomplished by a geartrain or chain drive G in FIGS. 1 and 2. The means M serves the purpose of transferring rotational power created in the turbine assembly T from the output shaft 1 to the crankshaft 2 where it is used to drive the intake and compression process. It also ensures that the intake and compression strokes are properly timed with the combustion and exhaust strokes.

The present invention's final main components are a first camshaft 3 and a second camshaft 4 which control the opening and closing of the front and back intake valves 55a, 55b and the front and back compression valves 42a, 42b; a means for mechanically connecting and synchronizing the output shaft 1 with the first camshaft 3, indicated by reference number 58a; and a means for mechanically connecting and synchronizing the output shaft 1 with the second camshaft 4, indicated by reference number 58b. The function of these last two components is to transfer rotational energy from the output shaft 1 respectively to the first camshaft 3 and the second camshaft 4.

Although the main elements of the present invention are normally positioned as shown in FIG. 1, in order to more clearly illustrate their mechanical connection and synchronization, FIG. 2 shows the following components forward of the turbine assembly T: the back piston-cylinder assembly Pb; the geartrain G; the means for connecting the output shaft to the first camshaft 3, 58a; and the means for connecting and synchronizing the output shaft 1 with the second camshaft 4, 58b. As shown in FIG. 2, shaft sprocket 20a is connected to output shaft 1 by key 21.

Also, it is important to note that use of the words "front" and "back" in connection with the elements of the presently described invention, in particular the piston-cylinder assemblies Pa, Pb, is not meant to place limitations on the spacial arrangement or positioning of the presently described invention as a whole, but is only meant to describe their location and positioning in connection with, and with respect to both similarly designated and oppositely designated elements. Additionally, for purposes of this application, the term "downstream" means a point on the interior surface of the turbine housing positioned further in the direction which the rotor 5 is rotating. Furthermore, the various elements of the present invention can be made from any known material which has the requisite tensile strength and heat resistance for use in an internal combustion engine.

Referring now to FIGS. 1 and 2, the variable blade turbine assembly T ("turbine assembly") has a front side F and a back side B. The turbine assembly T comprises a hollow and stationary turbine housing ("turbine housing") 12 which has a top portion, a bottom portion (FIG. 8) and a peripheral interior surface 19.

Rotatably provided Inside the turbine housing is a cylindrical rotor 5 to which at least one first variable blade and at least one second variable blade are pivotably attached. The rotor 5 has a rotational axis A which is also the rotational axis of the output shaft 1 described below. The rotor also has a first side, an second opposite side and an outer seal surface 6 which abuts the peripheral interior surface 19 of the turbine housing 12. The rotor 5 further comprises a first blade shaped notch 72 located on its first side, and a second blade shaped notch 73 located on its second opposite side.

At least one first variable turbine blade ("first turbine blade") 7 is pivotably connected to the first side of the rotor 5 so that it can swivel both inboard of the rotor 5, i.e., into the first blade shaped notch 72, as well as outboard of the rotor 5 in response to centrifugal force 51. Additionally, at least one second variable turbine blade ("second turbine blade") 8 is pivotably connected to the second opposite side of the rotor 5 so that it can swivel both inboard of the rotor 5, i.e., into the second blade shaped notch 73, as well as outboard of the rotor 5 in response to centrifugal force 51. The first and second blades can be connected to the rotor 5 by any means which will allow it to swivel as described above. For example, FIGS. 1 to 12 show the first and second turbine blades 7, 8 connected to the rotor 5 respectively by a first blade pin 48a, and a second blade pin 48b.

Furthermore, the first and second variable blades 7, 8 are also respectively provided with a first variable blade apex seal 50a and a second variable blade apex seal 50b. When the rotor is rotating, the first and second variable blade apex seals 50a, 50b engage the inner surface of the turbine housing 19 which helps to ensure that the combustion forces occurring on one side of the blade do not overcome the centrifugal forces and cause a leakage of gas and hence a loss of power.

Moreover, the first and second variable blades may also include a first variable blade swivel range control 56a and a second variable blade swivel range control 56b which serve to limit the load which is placed on the first and second variable blade apex seals 50a, 50b. Each of the variable blade swivel range controls 56a, 56b have a first end connected to their respective variable blades 7, 8 and a second end which is fixed to the rotor 5.

In addition to the rotor 5, the turbine housing 12 also comprises a first gas tight junction J1 where the outer seal surface 6 on the first side of the rotor 5 and the interior surface 19 of the turbine housing 12 meet as well as a second gas tight junction J2 where the outer seal surface 6 on the second side of the rotor 5 and the interior surface 19 of the turbine housing 12 meet.

The turbine housing 12 also contains combustion and exhaust chambers 14 in both its top and bottom portions in which simultaneous power and exhaust strokes 57, 62 take place. The combustion chambers 14 have a center point and are flanked by the first and second gas tight junction J1, J2, and are defined by the peripheral interior surface 19 of the turbine housing 12, the outer seal surface 6 of the rotor 5, and the first and second variable turbine blades 7, 8.

The turbine housing 12 further comprises a front turbine compression port 17a through which partially compressed air enters the turbine assembly T, located immediately downstream from the first gas tight junction J1. The front turbine compression port 17a comprises a back end and an outlet through which compressed air enters the combustion chambers 14. Similarly, the turbine housing also has a back turbine compression port 17b through which partially compressed air enters the turbine assembly T, located immediately downstream from the second gas tight junction J2. The back turbine compression port 17b comprises a back end and an outlet through which the compressed air enters the combustion chambers 14.

Furthermore, the turbine housing comprises a first transition point 16a on the peripheral interior surface 19 of the turbine housing 12 positioned immediately downstream from the outlet of the front turbine compression port 17a as well as a second transition point 16b on the peripheral interior surface 19 of the turbine housing 12 positioned immediately downstream from the outlet of the back turbine compression port 17b.

Also, a front fuel injector 49a is provided in the turbine housing 12 which serves the purpose of injecting fuel into and creating a fuel air mixture in the combustion and exhaust chambers 14. The front fuel injector 49a is located in the turbine housing 12 at a position immediately downstream from the outlet of the front turbine compression port 17a. Similarly, the turbine housing also comprises a back fuel injector 49b located in the turbine housing at a position immediately downstream from the outlet of the back turbine compression port 17b.

In addition, the turbine housing is provided with a front spark plug 30a, for igniting the fuel air mixture in the combustion and exhaust chambers 14 created by the front fuel injector 49a. The front spark plug 30a is positioned at the back end of the front turbine compression port 17a. Similarly, a back spark plug 30b is also provided and is positioned at the back end of the back turbine compression port 17b. It is understood that any suitable means for generating a spark is contemplated to be within the scope of the present invention and 30 defined by the general term spark plug.

Furthermore, the turbine housing 12 also comprises a first exhaust port 23a and a second exhaust port 23b through which exhaust gases leave the turbine assembly T. The first exhaust port 23a is located upstream of the second gas tight junction J2 and the second exhaust port 23b is located upstream of the first gas tight junction J1.

The portions of the peripheral interior surface 19 of the turbine housing 12 which are located between the first and second gas tight junctions J1, J2 on the top and bottom portions comprise a turbine housing cam contour 18 for forcing the first and second variable blades 7, 8 inboard of the rotor 5 as it rotates. The turbine housing cam contour 18 turbine housing shaped so that its inner contours create high points and low point relative to the rotational axis A of the rotor 5 and output shaft 1. It comprises a radius from the rotor 5 and output shaft's 1 axis of rotation A which is greatest at the center of the combustion and exhaust chambers 14. The turbine housing cam contour's radius then begins to gradually tapper off toward both the first and second gas tight junctions J1, J2.

Moving on to the other main components, it is essential that there be at least one piston assembly Pa, Pb for each variable turbine blade 7, 8 connected to the rotor 5. Thus, the preferred embodiment of the present invention comprises at least one front piston-cylinder assembly Pa for feeding compressed air to the turbine assembly T The front piston-cylinder assembly Pa comprises a front piston housing 15a connected to the front side of the turbine assembly T and a front intake and compression chamber 39 having a top end. The front piston-cylinder assembly Pa also comprises a port 44, for transferring partially compressed air to the turbine assembly T, located at the top end of the front intake and compression chamber 39 and positioned adjacent to the variable blade turbine assembly T. The front compression transfer port is in line with the front turbine compression port 17a.

Additionally, the front piston-cylinder assembly also comprises a front compression transfer valve 42a for opening and closing the front compression transfer port 44. Also, the front piston-cylinder assembly Pa comprising a front air intake and compression piston 27a which has a bottom surface and which is slidably positioned within the front intake and compression chamber 39. a front connecting rod 29a is pivotably connected to the bottom surface of the front air intake and compression piston 27a Furthermore, a front air intake port 54a is located at the top end of the front intake and compression chamber 39 through which air is drawn into the front intake and compression chamber 39. Moreover, a front air intake valve 55a for opening and closing the front air intake port 54a is also provided.

The preferred embodiment of the present invention also comprises at least one back piston-cylinder assembly Pb for feeding compressed air to the turbine assembly T. Back assembly or housing Pb is substantially monolithic cast metal or alloy such as cast iron or cast iron plus additives.

The back piston-cylinder assembly Pb comprises a back piston housing 15b connected to the back side of the turbine assembly T and a back intake and compression chamber 41 having a top end. The back piston-cylinder assembly Pb also comprises a back compression transfer port 45, for transferring partially compressed air to the turbine assembly T, located at the top end of the back intake and compression chamber 41 and positioned adjacent to the variable blade turbine assembly T. The back compression transfer port 45 is in line with the back turbine compression port 17b.

Additionally, the back piston-cylinder assembly Pb also comprises a back compression transfer valve 42b for opening and closing the back compression transfer port 45. Also, the back piston-cylinder assembly Pb comprising a back air intake and compression piston 27b which has a bottom surface and which is slidably positioned within the back intake and compression chamber 41. a back connecting rod 29b is pivotably connected to the bottom surface of the back air intake and compression piston 27b. Furthermore, a back air intake port 54b is located at the top end of the back intake and compression chamber 41 through which air is drawn into the back intake and compression chamber 41. Moreover, a back air intake valve 55b for opening and closing the back air intake port 54b is also provided.

In the preferred embodiment of the present invention, the stationary turbine housing 12 is integral with the front piston-cylinder housing Pa and the back piston cylinder housing Pb. These three housings, 12, Pa and Pb, can be formed out of a single piece of material or they can be welded together.

The preferred embodiment of the present invention also comprises a crankshaft 2 which drives the movement of the intake and compression pistons 27a, 27b. The crankshaft 2 is pivotably connected to the front connecting rod 29a by a first crankpin 31 and is pivotably connected to the back connecting rod 29b by a second crankpin 32.

Furthermore, the preferred embodiment of the present invention also comprises a first camshaft 3 and a second camshaft 4 which control the opening and closing of the front and back intake valves 55a, 55b and the front and back compression transfer valves 42a, 42b. The first camshaft 3 comprises a front compression cam lobe 43a located above the front compression transfer valve 42a for controlling the opening and closing of the front compression transfer valve 42a. It also comprises a front intake cam lobe 26a located above the front air intake valve 55a for controlling the opening and closing of the front air intake valve 55a.

Similarly, the second camshaft 4 comprises a back compression cam lobe 43b located above the back compression transfer valve 42b for controlling the opening and closing of the back compression transfer valve 42b. The second camshaft 4 also comprises a back intake cam lobe 26b located above the back air intake valve 55b for controlling the opening and closing of the back air intake valve 55b.

FIG. 2 shows how the output shaft, the crankshaft, and the two cam shafts are synchronized. These three main components ensure that all the elements of the engine are in the proper position when the spark plugs 30a, 30b ignite the fuel gas mixture 80 in the combustion and exhaust chambers 14 of the turbine assembly T.

The first of the three elements which facilitate the synchronization and timing of the engine is the means for synchronizing and mechanically connecting the output shaft 1 to the crankshaft 2, indicated by reference character "M."

FIGS. 1 and 2 show the output shaft 1 and the crankshaft 2 connected and synchronized by a geartrain G which is comprised of an output shaft gear 9 which is fixedly attached to, and rotates with the output shaft 1; a crankshaft gear 11 fixed to the crankshaft 2, and an intermediate gear 10 which links the output shaft gear 9 with the crankshaft gear 11. Although FIGS. 1 and 2 show the geartrain G having three gears, any number of individual gears which can achieve the proper ratio and synchronization may be used. In addition, other means may be used to mechanically connect and synchronize the output shaft 1 and the crankshaft 2. For example, a sprocket wheel and chain assembly (not shown) comprised of an additional output shaft sprocket attached to the output shaft 1, a crankshaft sprocket connected to the crankshaft 2 and a sprocket chain which meshes with both can be used.

In the preferred embodiment, the gear ratio of the means for mechanically connecting and synchronizing the output shaft 1 to the crankshaft 2 M is configured at roughly 2:1 so that there is two intake, compression strokes per piston-cylinder assembly and two combustion and exhaust strokes per each variable blade 7, 8 for each single rotation of the output shaft 1.

Finally, the preferred embodiment of the present invention comprises a means for mechanically connecting and synchronizing the output shaft 1 to the first camshaft 3 and a means for mechanically connecting and synchronizing the output shaft 1 to the second camshaft 4.

Both the first camshaft 3 and the second camshaft 4 are mechanically connected to the output shaft 1 in such a way that their rotation is synchronized with the rotation of the output shaft 1. In FIGS. 1 and 2 the means for mechanically connecting the output shaft to the first camshaft 3 and the second camshaft 4 is respectively accomplished by a first sprocket assembly Sa and a second sprocket assembly Sb.

The first sprocket assembly Sa comprises a first camshaft sprocket 13a fixedly attached to the first camshaft 3; a first output shaft sprocket 20a fixedly attached to the output shaft and a first camshaft drive belt 22a connected to both the first camshaft sprocket 13a and the first output shaft sprocket 20a. The second sprocket assembly Sb comprises a second camshaft sprocket 13b fixedly attached to the second camshaft 4, a second output shaft sprocket 20b fixedly attached to the output shaft and a second camshaft drive belt 22b connected to both the second camshaft sprocket 13b and the second output shaft sprocket 20b.

In addition, other means may be used to mechanically connect and synchronize the output shaft 1 with both the first and second camshafts 3, 4. For example, two additional geartrains (not shown) could provide such a means.

Referring now to FIGS. 2-12, the engine of the present invention 100 utilizes conventional pistons to perform only two (2) strokes, i.e., intake and compression, while the power and exhaust strokes take place in the variable blade turbine assembly T. A compressed mixture of air and fuel (80) ignites at a predetermined spot and the resulting combustion forces push against the variable blades which then cause the rotor and output shaft to rotate hence creating rotational power.

In the preferred embodiment of the present invention the rotor 5 rotates counterclockwise 60. However, it is possible to configure the main components so that the rotor 5 rotates clockwise. Turbine blades outward movement is induced by centrifugal forces created when the rotor rotates.

FIGS. 3 to 7, for the purpose of clarity, depict a view of only one side of what is actually a symmetrical operation. In an engine according to a preferred embodiment of the present invention, the timing is configured so that there are two (2) combustion/exhaust cycles, i.e., two power strokes and two exhaust strokes, per each variable blade 7, 8, for every single rotation of the output shaft 1. This amounts to a total of four (4) combustion strokes for every single rotation of the output shaft 1. Accordingly, there is also two (2) intake/compression cycles, i.e., two intake strokes and two partial compression strokes, per each variable blade 7, 8 for every single rotation of the output shaft 1.

Thus, although in FIGS. 3 to 7 do not show cross sections of the back piston assembly, the front piston-cylinder assembly Pa and the back piston-cylinder assembly Pb are synchronized so that the movement of pistons 27a, 27b inside the front and back intake and compression chambers 39, 41 begin and end at the same time. That is to say that they progress through their intake and compression strokes in an identical manner.

Referring now to FIGS. 2 to 12, the present invention performs its respective strokes as follows. First is air Intake in both the front and back piston assemblies Pa, Pb. Next is partial compression. When the air has been partially compressed in the piston assemblies, it is transferred to the turbine assembly where full compression takes place. After full compression fuel injection and ignition take place and the ignition starts the power stroke.

The compression transfer valve 42a opens front and back ports 44 and 45, allowing pre compressed air to rush through connecting port between cylinder piston assembly and variable blade turbine assembly. A valve controls the flow of air, between the cylinder piston assembly, and the turbine chamber, said valve is in a closed position during intake cycle at the piston-cylinder assembly, and closed during partial compression at the piston-cylinder chamber, open during compression cycle, allowing air to rush through the cylinder port to the turbines combustion and exhaust chambers 14 and closed during turbine ignition/exhaust cycle.

Ports 44, 45, 17a and 17b connect the cylinder housing and the Turbine housing. These port have valves, which are regulated by a cam lobes 26a, 26b on the camshafts 3, 4, controls the airflow between the cylinder and the Turbine Said port valve or valves have two positions, closed during air intake, closed during partial compression, open during compression, allowing air to rush through the port, and closed during Turbine power/exhaust cycle. Exhaust generated by the predecessor variable turbine blade, is expelled by the successor variable turbine blade.

In the preferred embodiment pistons 27a and 27b feed compressed air to each variable blade 7, 8 twice per power output shaft 1 single revolution. The piston-cylinder assemblies feed compressed air through a valve train which consists of first and second camshafts 3, 4; the front and back intake cam lobes 26a, 26b; the front and back compression cam lobes 43a, 43b; front and back air intake ports 54a, 54b and to the combustion and exhaust chambers in the turbine housing T.

In the preferred embodiment, the rotor 5 is rotation counterclockwise 60, the power output shaft 1 rotates along with the rotor, and gear trains 9, 10, 11 the gear train 11 is connected to the crankshaft 2, the crankshaft is connected to pistons 27 via connecting rods 29, thus the rotor 5 spin is synchronized with the pistons 27a, 27b intake and compression cycles. the gears ratio 9 to 10, 11 of approximately 2:1 allow for two (2) intake and compression cycles per power output shaft 1 single full rotation, per each piston, thus in full rotation of power output shaft 1 there will be (4) combustion 61 cycles, (2) for each variable blade 7, 8. Along with their respective compression 25 cycles and exhaust cycles 62. (FIGS. 1 and 3 through 12).

Figure 3:
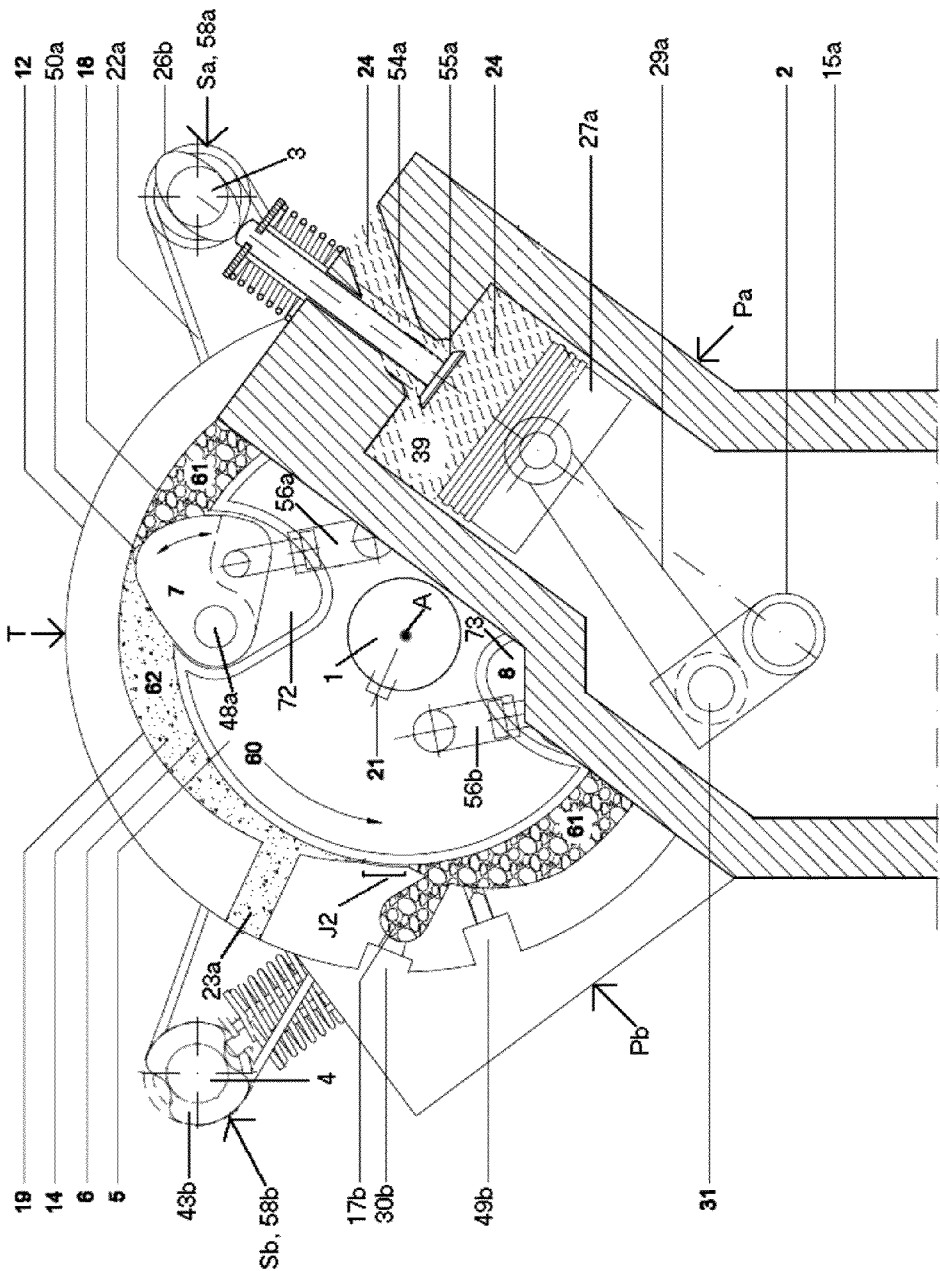
FIG. 3 is a schematic view of variable blade turbine internal combustion engine according to an embodiment of the present invention, showing a cross section of the front piston-cylinder assembly and a partial cross section of the turbine assembly, further showing the front air intake port and front air intake valve of the front piston-cylinder assembly about half way through its intake stroke and also showing the turbine assembly undergoing simultaneous power and exhaust strokes.

FIGS. 2 and 3 show the front piston-cylinder assembly in Mid-intake cycle, showing the piston assembly taking in air, 24 while the rotor is in a combustion/power cycle, 61 right of the shown variable blade 7, and exhaust cycle, 62 left of the shown variable blade 7. See FIG. 4 for the completed intake cycle, showing the piston 27 in the lowest position, the intake chamber filled to capacity with air intake 24, and the intake valve 55 closed, shown is the turbine 5, at the end of combustion/power cycle, 61, (right of the shown variable blade 7, and exhaust cycle, 62, left of the shown variable blade 7.

Figure 4:
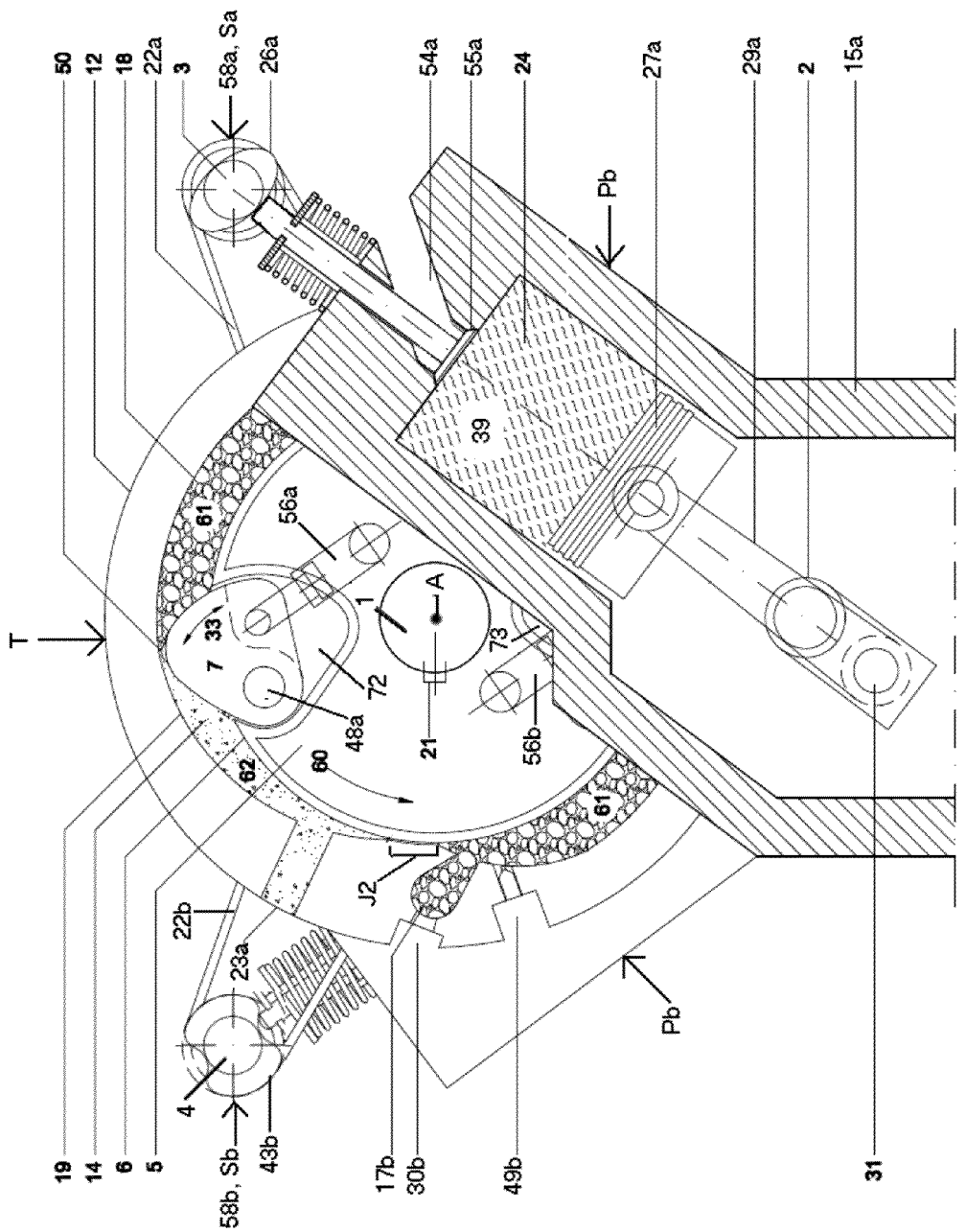
FIG. 4 is a schematic view of variable blade turbine internal combustion engine according to an embodiment of the present invention, showing a cross section of the front piston-cylinder assembly and a partial cross section of the turbine assembly, also showing the front air intake port and front air intake valve of the front piston-cylinder assembly when positioned at bottom dead center after completing an intake stroke, and further showing the turbine assembly at the end of its power stroke.
Figure 5:
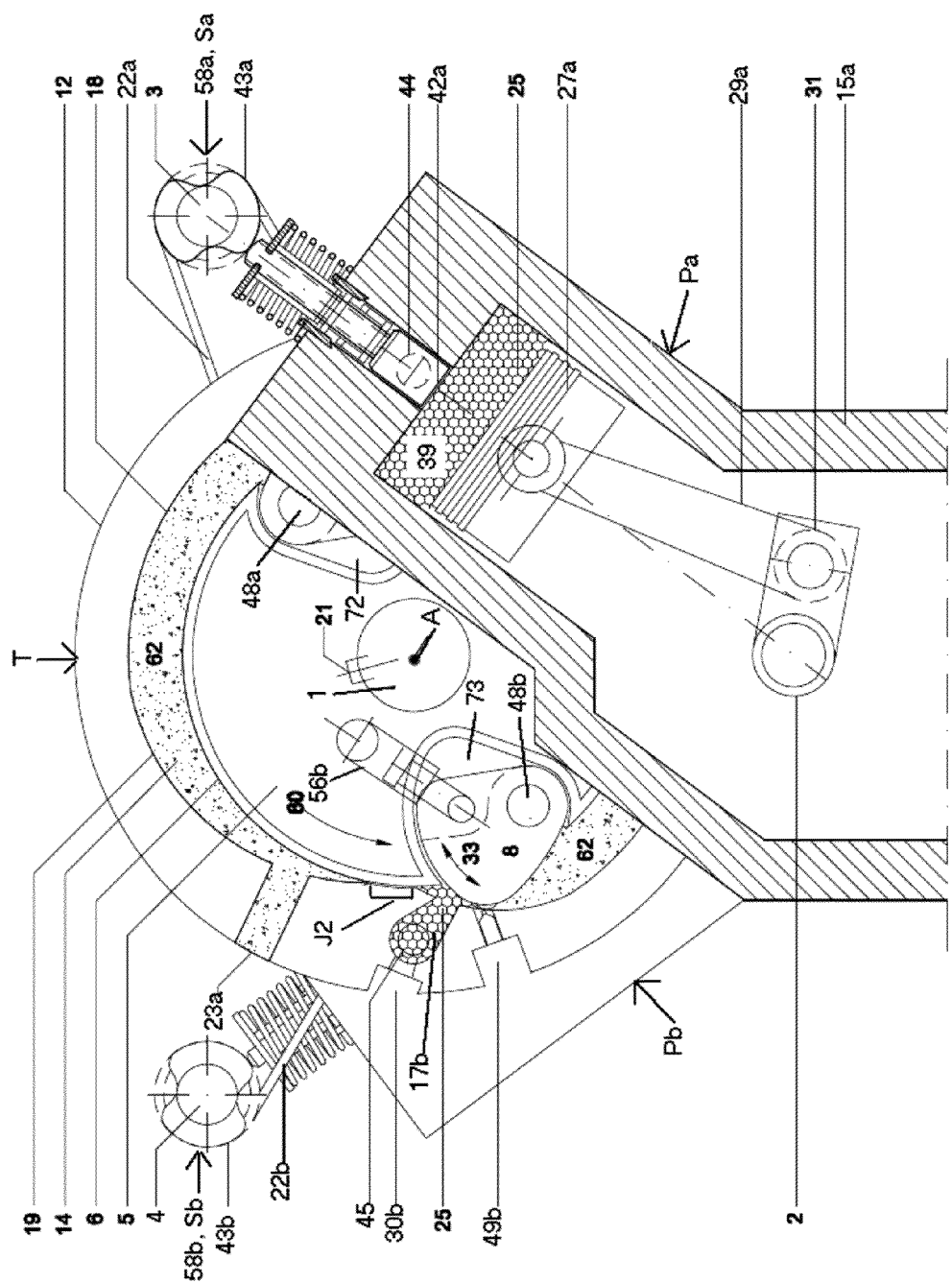
FIG. 5 is a schematic view of variable blade turbine internal combustion engine according to an embodiment of the present invention, showing a cross section of the front piston-cylinder assembly and a partial cross section of the turbine assembly and showing the front compression transfer port and the front compression transfer valve of the front piston-cylinder assembly immediately before the opening of the compression transfer valve, and also showing the turbine assembly at the beginning of its exhaust stroke.
Figure 6:
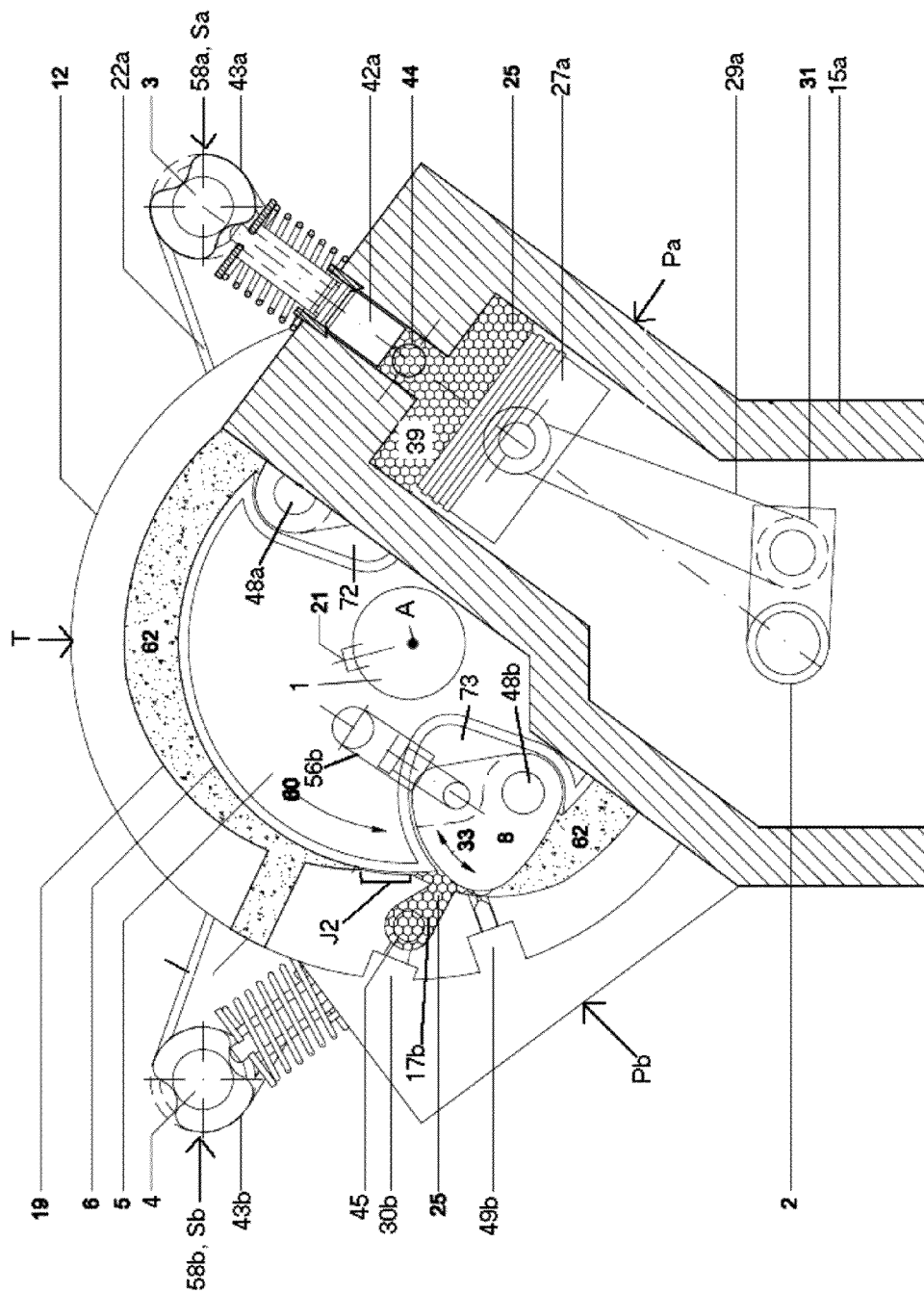
FIG. 6 is a schematic view of variable blade turbine internal combustion engine according to an embodiment of the present invention, showing a cross section of the front piston-cylinder assembly and a partial cross section of the turbine assembly and showing the front compression transfer port, the front compression transfer valve and pre-compressed air in the front piston-cylinder assembly at the moment the compression transfer valve opens and showing the turbine assembly at the beginning of its exhaust stroke.
Figure 7:
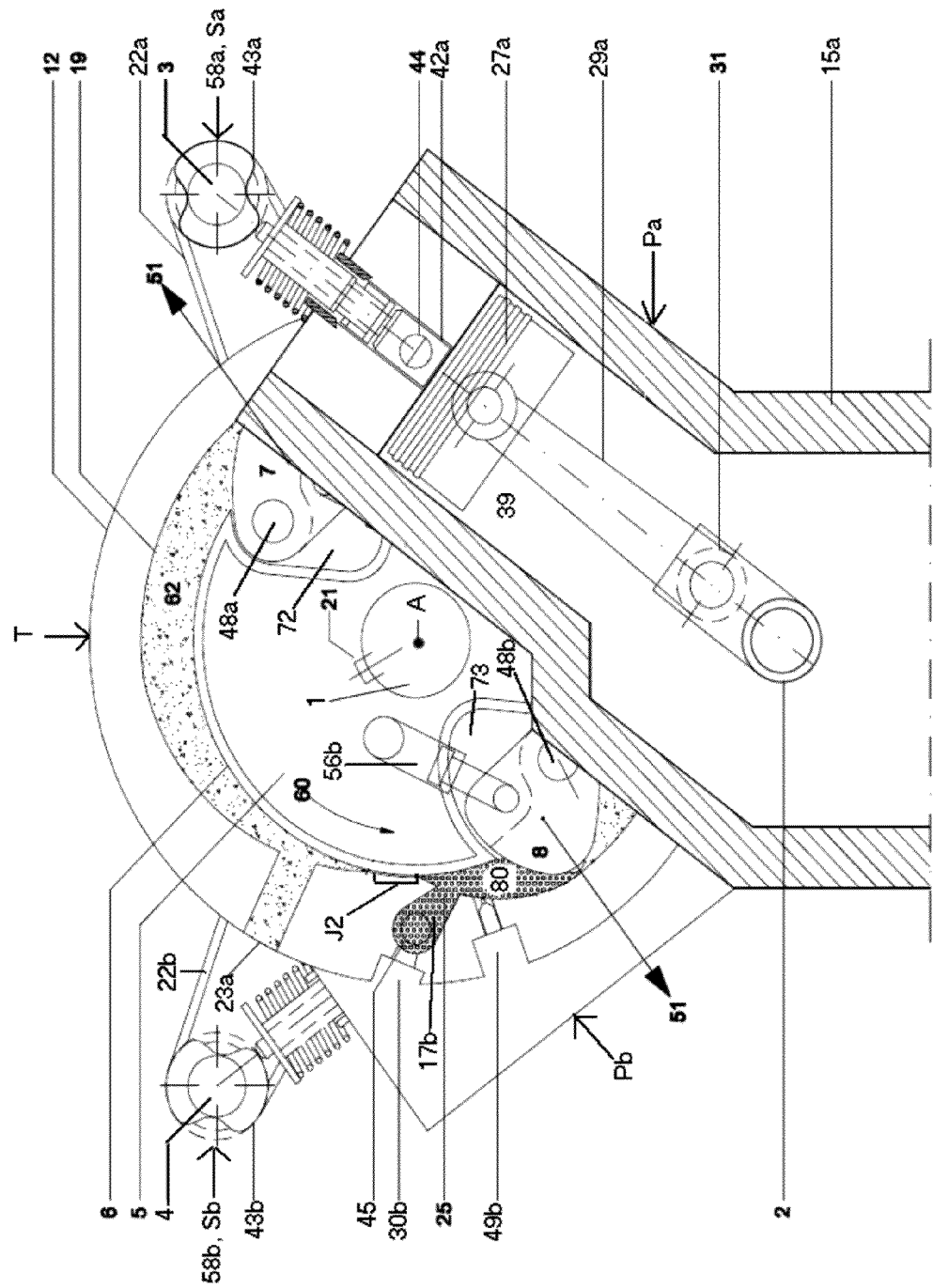
FIG. 7 is a schematic view of variable blade turbine internal combustion engine according to an embodiment of the present invention, showing a cross section of the front piston-cylinder assembly and a partial cross section of the turbine assembly, showing the front piston-cylinder assembly after completing a compression transfer stroke with the front piston positioned at top dead center as well as the turbine assembly in simultaneous ignition and exhaust strokes.
Figure 8:
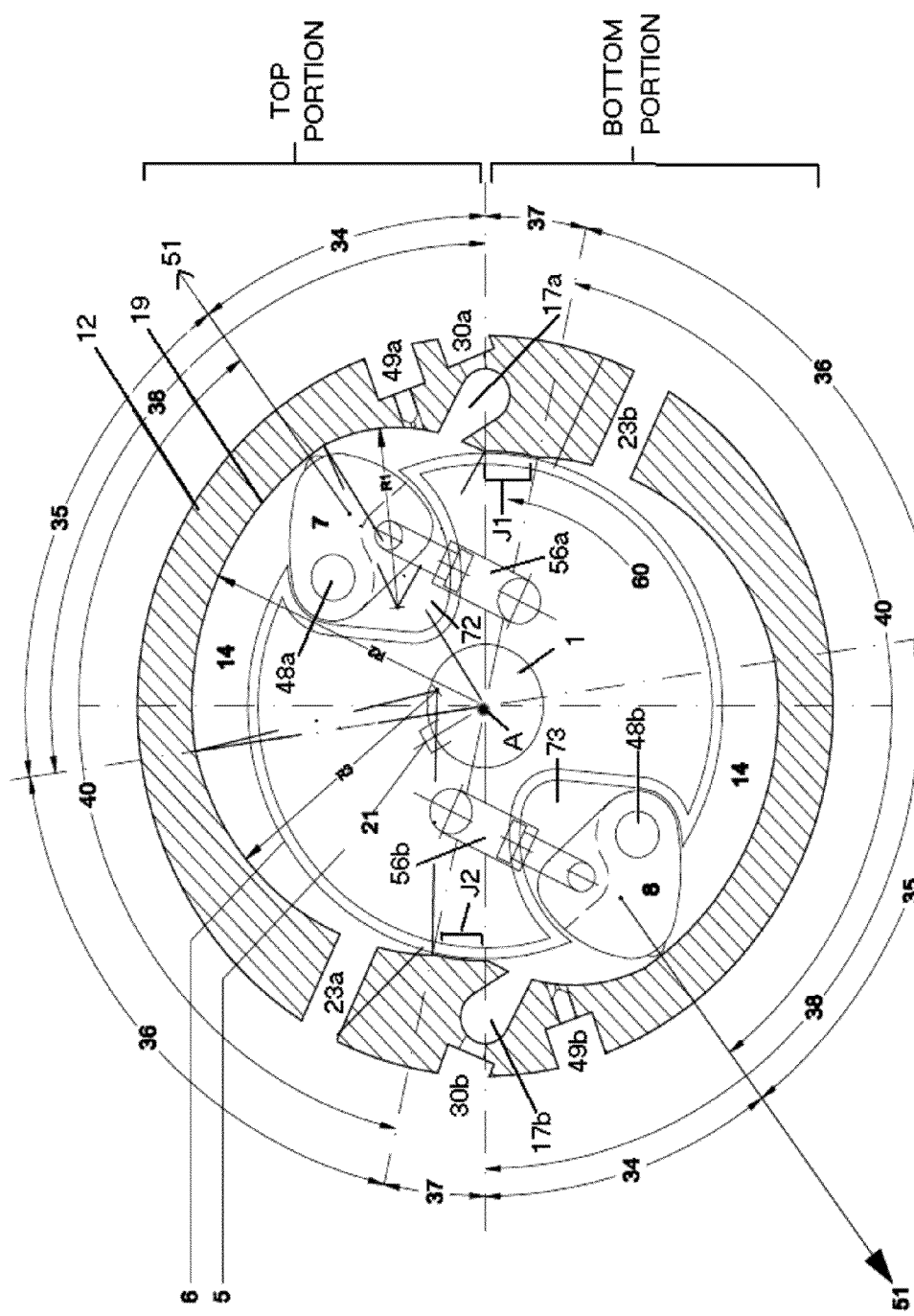
FIG. 8 is a schematic cross sectional view of the variable blade turbine assembly of a variable blade turbine internal combustion engine according to an embodiment of the present invention, showing the turbine assembly at full compression and showing with arrows the extent of combustion/power and exhaust cycles.
Figure 9:
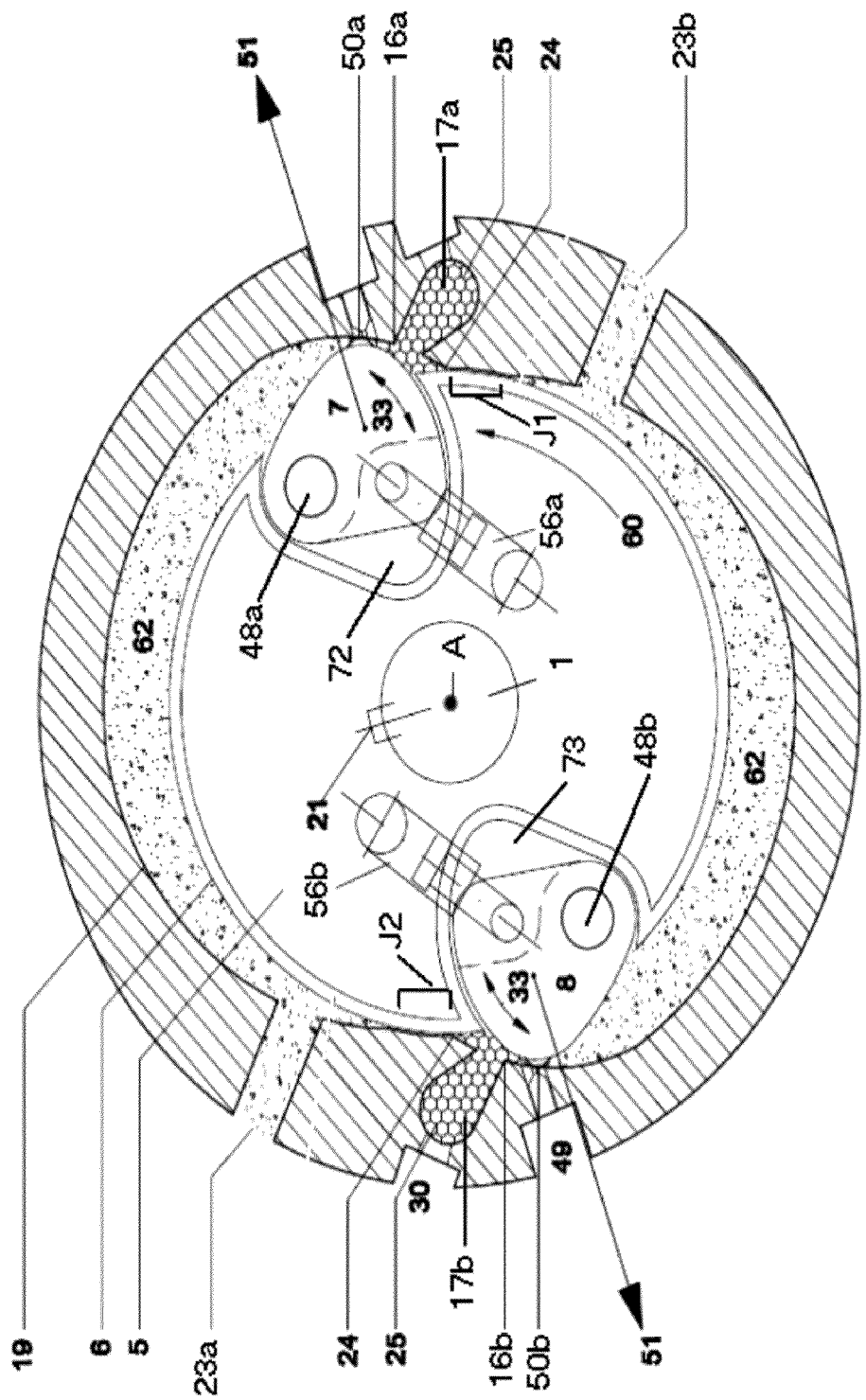
FIG. 9 is a schematic cross sectional view of the turbine assembly of a variable blade turbine internal combustion engine according to an embodiment of the present invention, showing the very beginning of turbine compression cycle.
Figure 10:
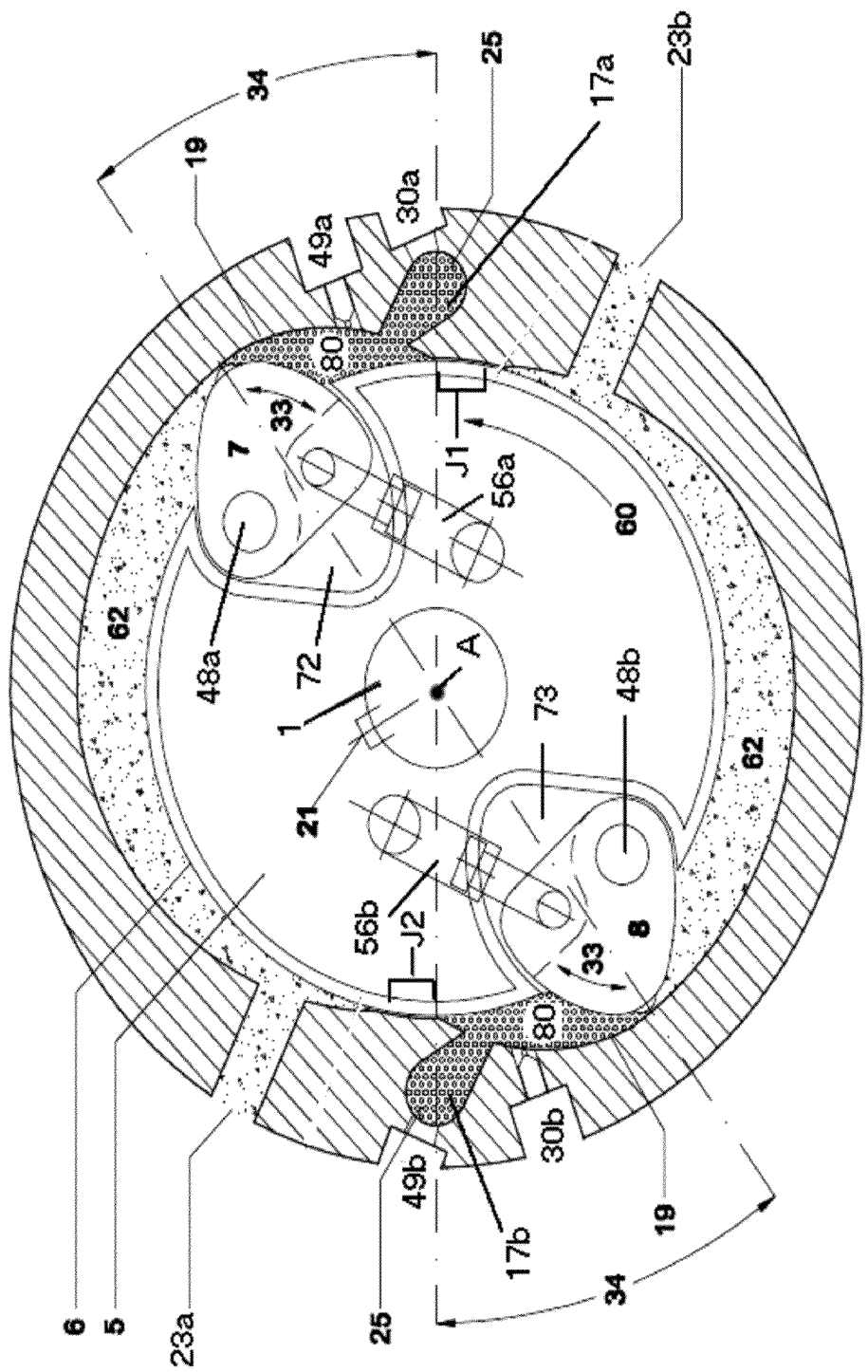
FIG. 10 is a schematic cross sectional view of the turbine assembly of variable blade turbine internal combustion engine according to an embodiment of the present invention, showing full compression.

In FIGS. 2 and 3 the pistons 27a and 27b (not shown) are in the middle of their intake stroke taking in air. In FIG. 4 the pistons have completed their intake stroke and are at dead low point of the crankshaft 2, the piston have completed the air intake cycle 24 (FIG. 4) the air intake valves 55a, 55b are in their closed position and the compression transfer valves 42a, 42b are in their closed position, FIG. 4 with the crankshaft 2, 31 rotation and the pistons 27 upward movements in cylinders 39, 41 (FIGS. 1, 2) a partial compression 25 is taking place (FIG. 5) this is a depiction of split second prior to the compression transfer valves opening to allow the partially compressed air through the air transfer port (FIGS. 5, 6) onto the turbine compression zone (FIG. 7). The compression transfer valves opens (FIG. 6) to allow for partially compressed air to rush through port 44 onto the zone 34, (FIG. 10). The compression process takes place split second after the variable blades 7, 8 passed the point 49, (FIG. 9) and variable blades 7,8 start swiveling outward under centrifugal force 51, (FIG. 9). Once the variable blades 7, 8, pass the critical points with the apex seal 50 (FIG. 9) covering the compression transfer port 17, (FIG. 2) pre compressed air 25 (FIG. 9) is rushing to the sealed combustion chamber created between the rotor 5, the variable blades 7, 8, variable blade apex seal 50 (FIG. 9) and the turbine cam contour 19 (FIG. 8) the compression transfer valve is opened by the camshaft lobe 43 (FIG. 6) allowing the partially compressed air 25 to rush onto the turbine compression chamber and compression zone (FIGS. 9, 10) the full compression (FIG. 10) is achieved when the pistons 27 continuously presses the remaining air volume 25 (FIG. 6) to full compression volume through port 44 (FIGS. 6) and as shown at FIG. 6 the compression chamber is in fully compressed capacity, (FIG. 7) while the piston position is at dead head, (FIG. 7) at this very moment the compression transfer valve is closed by the camshaft lobe 43 (FIG. 7), fuel is injected through fuel injectors (FIG. 7) and ignition by sparkplugs takes place.

pistons 27 and the cylinders 39, 41 (FIG. 1) compress the air that is taken up into the and then compress and feed the compressed air into the turbine compression zone, (FIGS. 8, 10). Air intake is indicated by reference 24 in FIGS. 2 to 4. In a preferred embodiment, the pistons 27 are feeding compressed air to each variable blade twice per power output shaft 1 single revolution, (FIG. 1 and FIGS. 3 to 12). The piston-cylinder assembly is feeding compressed air through valve train 3, 26, 43, 54 to a turbine combustion zone, FIG. 10, the turbine combustion zone is defined by variable blades 7, 8 pulling under centrifugal force 51, outboard of the rotor 5, and onto the contoured combustion space 19, (FIGS. 9, 10) when the variable blades 7, 8, apex 50, reaches the designated ignition point, end of segment as depicted in compression zone, (FIGS. 8, 10), fuel is injected through injectors 49, and spark is initiated through sparkplugs 30. and the resulting combustion triggered the power stroke. (FIGS. 10, 11) Segment 40, and combustion 61, (FIG. 11) depict the duration of power cycle.

As mentioned above, the turbine housing 12 is contoured with high points and low points relative to the axis of rotation of the rotor 5 and power output shaft 1, the cam contour shape resembles somewhat eight (8) like figure, comprising symmetrically of four (4) radiuses (See FIG. 8), from each side of the housing centerline, (total of eight radiuses) the first radius is to define the compression stage, it is opened outward of the rotor, to allow for a turbine blade outward expansion, the second radius, is positioned in the center of the power output shaft, and it follows the combustion stroke cycle, the third radius is the retraction radius, to force the blade inward onto the rotor, the fourth radius is the transition radius, it is centered in the centerline of the power output shaft, and it allows for transition of the blade between exhaust and compression cycle. Turbine variable blades outward and inward movements are restricted by turbine housing cam contour 18. While the rotor 5 is rotating, the variable blades 7, 8, are following the cam shaped housing contour. While the rotor 5 is spinning, rotating variable blades 7, 8 are forced inward by the cam configuration of the housing 12. While the rotor is spinning, rotating variable blades are forced outward from the low point by a centrifugal force.

The piston-cylinder assembly is feeding compressed air through valve train 3, 26, 43, 54 to a turbine assemblies T combustion and exhaust chambers 14.

when the apexes 50a, 50b of the variable blades 7, 8, reaches the designated ignition point, end of segment 34 as depicted in compression zone 34, (FIGS. 8, 10), a compressed mixture of air and fuel (80) ignites at predetermined spot and the resulted combustion forcing against the variable blades creates rotational output power motion fuel is injected through injectors 49a, 49b, and the spark is initiated through the sparkplugs 30a, 30b. and the resulting combustion triggeres the power stroke. (FIGS. 10, 11) Segment 40, and combustion 61, (FIG. 11) depict the duration of power cycle.

Figure 11:
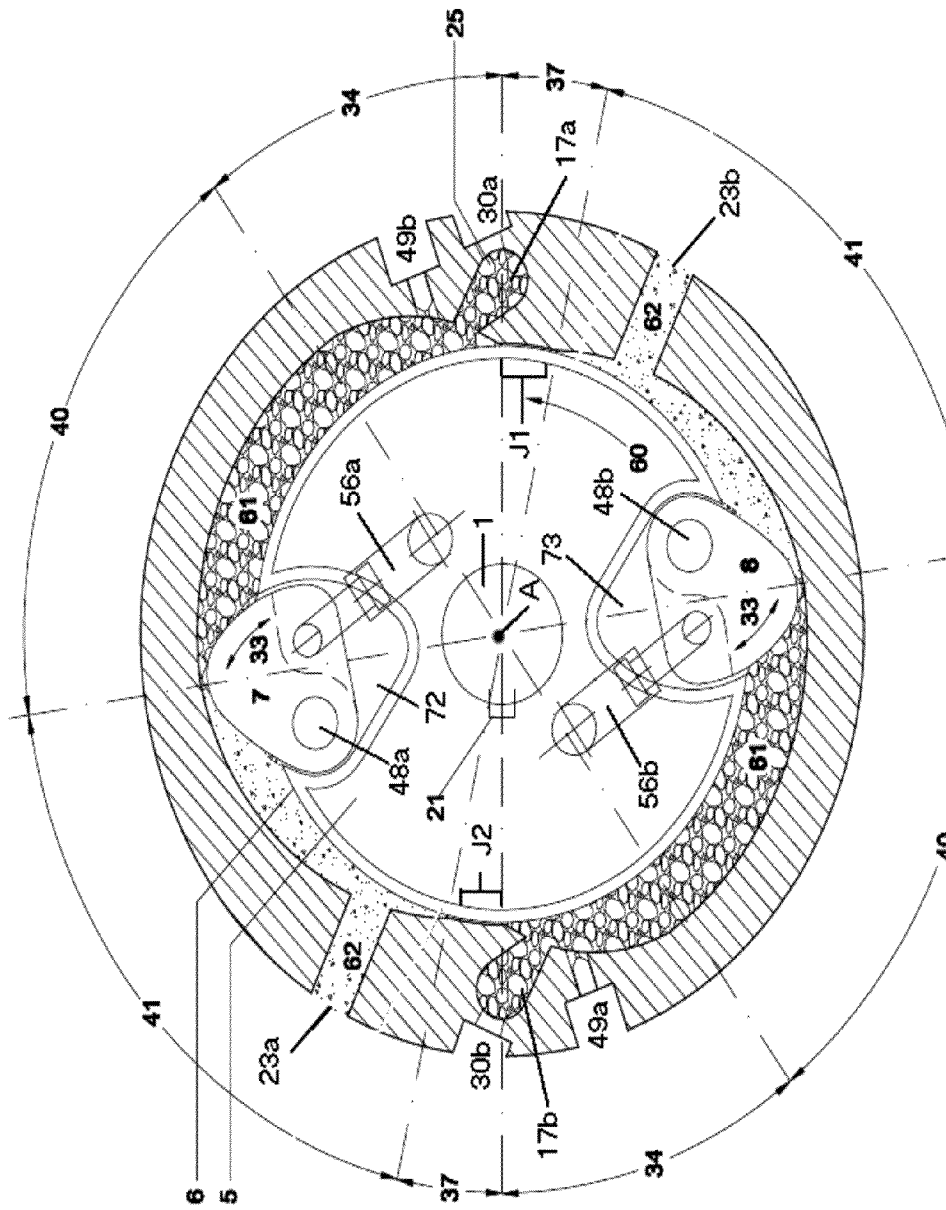
FIG. 11 is a schematic cross sectional view of the turbine assembly of variable blade turbine internal combustion engine according to an embodiment of the present invention, showing with arrows the completed power stroke.
Figure 12:
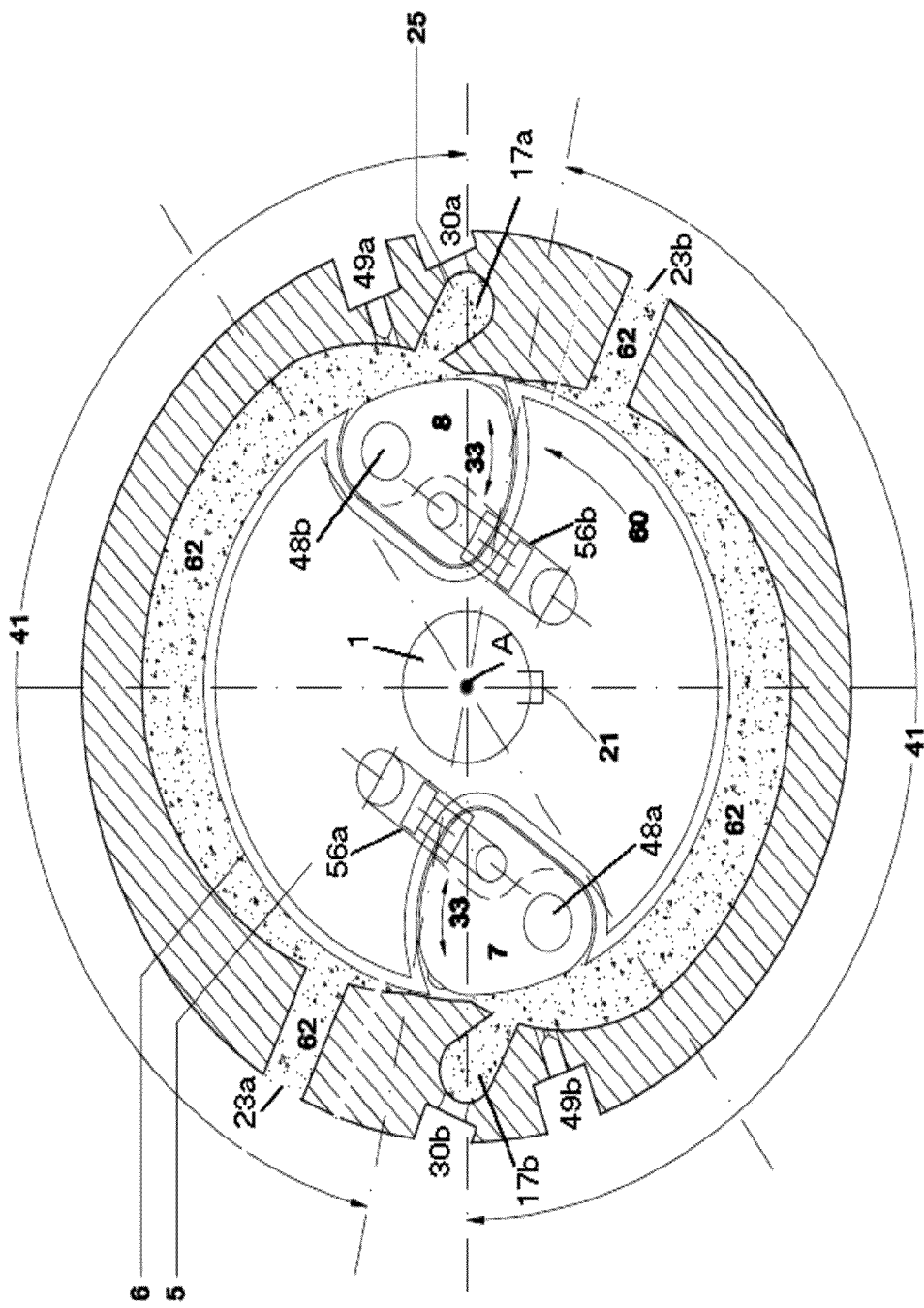
FIG. 12 is a schematic cross sectional view of the turbine assembly of a variable blade turbine internal combustion engine according to an embodiment of the present invention, showing variable blades fully retracted, i.e., inboard of the rotor and showing exhaust gasses filling the combustion and exhaust chambers.

Combustion power cycle/exhaust cycle/and simultaneous intake and partial compression cycle:

Combustion takes place as depicted in segment, (FIG. 10) the combustion forces the rotor 5 to rotate counterclockwise 60 (FIG. 10) the combustion chambers 14 boundaries are the rotor seal 6, the apex seal 50, the variable blades 7, 8 (FIG. 10) and the casing cam contour R1, R2, R3 radius FIG. 8. This effectively is the chamber forcing the rotor 5 and the power output shaft 1 in a counterclockwise direction 60. The expansion of the combustion is depicted at FIG. 11. The expanding gases 61 (FIG. 11) range is defined by the segment arrow 40 (FIG. 11) this is the range of the effective combustion power cycle. While the variable blades are under combustion power forces 61 as depicted in FIG. 11, exhaust gases 62 from predecessor cycle are being forced out by the variable blades 7, 8 (FIG. 11) through ports 23*a*, 26*b*, (FIG. 11) these exhaust gases from the prior power stroke. variable blade 7 clears the exhaust remaining from variable blade 8, and variable blade 8 clears the exhaust gases generated by variable blade 7. The full range of the exhaust cycle is described 62 is marked by segment 41, (FIG. 12) the variable blades 7 and 8 are in transition, and the spent exhaust 62 is lingering (split second) in the chambers boundaries, as defined by the rotor 5, the rotor seal 6, the cam casing contour 19, the variable blades 7, 8 and the apex seal 50. (FIGS. 9, 12).

The valve trains work as follows. Cam lobes 26*a* and 26*b* activating the intake valves 55*a*, 55*b*, and cam lobes 43*a*, 43*b* activate the compression transfer valves 42*a*, 42*b* (FIGS. 1 to 7).

The variable blades 7, 8 are subject to three type of forces, centrifugal forces 51, combustion forces 61, and cam contour 18 shape forces the blade gradually inboard onto the rotor 5. While the rotor 5 (FIGS. 1 and 3 to 12) is spinning counterclockwise 60, the centrifugal force 51 (FIG. 9) is forcing the turbine blades 7, 8, outboard 33 of the rotor 5 (FIG. 9) and the apex seals 50*a*, 50*b* (FIG. 9) engage the engine cam contour 19. The opening of the variable blades 7, 8, is limited by the blade expansion limiter 56 described above. The expansion limiter serves two functions; it is limiting the load on the apex seal 50 and the cam contour 19, and transferring the combustion/power forces from the blades 7, 8 to the rotor 5.

The counterclockwise rotation of the rotor 5 is generating power through the power output shaft 1; (FIG. 1) the gear train 9, 10, 11 is transferring rotation from power output shaft 1 to the crankshaft 2, (FIG. 1) and camshaft 3, is driven by gears 20, (FIG. 2) this synchronize the pistons 27 (FIGS. 1, 3, 4) downward air intake movements 24, (FIGS. 1, 3, 4). The air intake valves 55*a*, 55*b* are opened by the camshaft 3, and the cam intake lobes 26*a*, 26*b*, once the pistons 27*a*, 27*b* reach the dead low point (FIG. 4) the air intake valves 55*a*, 55*b* are closed by cam lobe position 26, (FIG. 4) the compression transfer valve (FIGS. 4, 5) remains in closed position, the pistons 27*a*, 27*b* are in an upward compression movement compressing the air 25 (FIGS. 5, 6). The air is partially pre compressed due to the short window of timing to allow the compressed air flow to the turbine combustion chamber zone, FIG. 8, 10) between variable blades 7, 8 and the turbine contoured compression zone, (FIGS. 8, 10) and fully compressed when the pistons 27*a*, 27*b* reach top dead center at depicted in FIG. 7.

While the rotor 5 is rotating counterclockwise 60, the pistons 27*a*, 27*b* are taking in air 24 (FIGS. 1, 3, 4) simultaneously in preparation for the next combustion cycle 105.

When the engine is under combustion/power cycle, 61, (FIGS. 1, 3, 4, 10, 11) the segment of effective combustion cycle 40 (FIG. 11), is forcing the rotor 5 in a counterclockwise 60 rotation, the variable blades 7, 8 (FIG. 11) are fully extended, the blade swivel limiters 56*a*, 56*b* are fully extended, and the apex seals 50*a*, 50*b* are fully engaging the internal cam contour 19. At the end of power stroke, residual exhaust gases 62, from predecessor cycle, are pushed out by variable blades 7, 8, through exhaust 23*a* and 23*b*.

The exhaust gases linger for a split second in chambers 14. Once each of the variable blades 7, 8 pass the transition points 16*a*, 16*b* (FIGS. 9, 11, 12) they are immediately forced outward 33 in a swivel motion about their blade pins 48*a*, 48*b*, by the centrifugal force 51, created by the rotor 5 rotation about its axis. As a result the variable blades 7, 8 engage the internal cam contour 19, and are constantly pushing the exhaust gases 62 through exhaust ports 23*a*, 23*b*. this takes place from the moment the variable blades 7, 8 pass the transition phase (FIG. 9). The variable blades have constant exhaust on one side, 62, while compression air transfer 25 (FIG. 9) is taking place and full compression ignition (FIG. 10) and combustion 61 (FIG. 11) is taking place opposite side or other side of the variable blades 7, 8. And apex seals 50*a*, 50*b*. With the exception of the transition cycle 37 (FIGS. 11, 12) the variable blades 7, 8 are constantly under combustion on one side of the blade, and constantly exhausting on the other side of the blades. (FIGS. 1 and 3 through 11)

Figure 13:
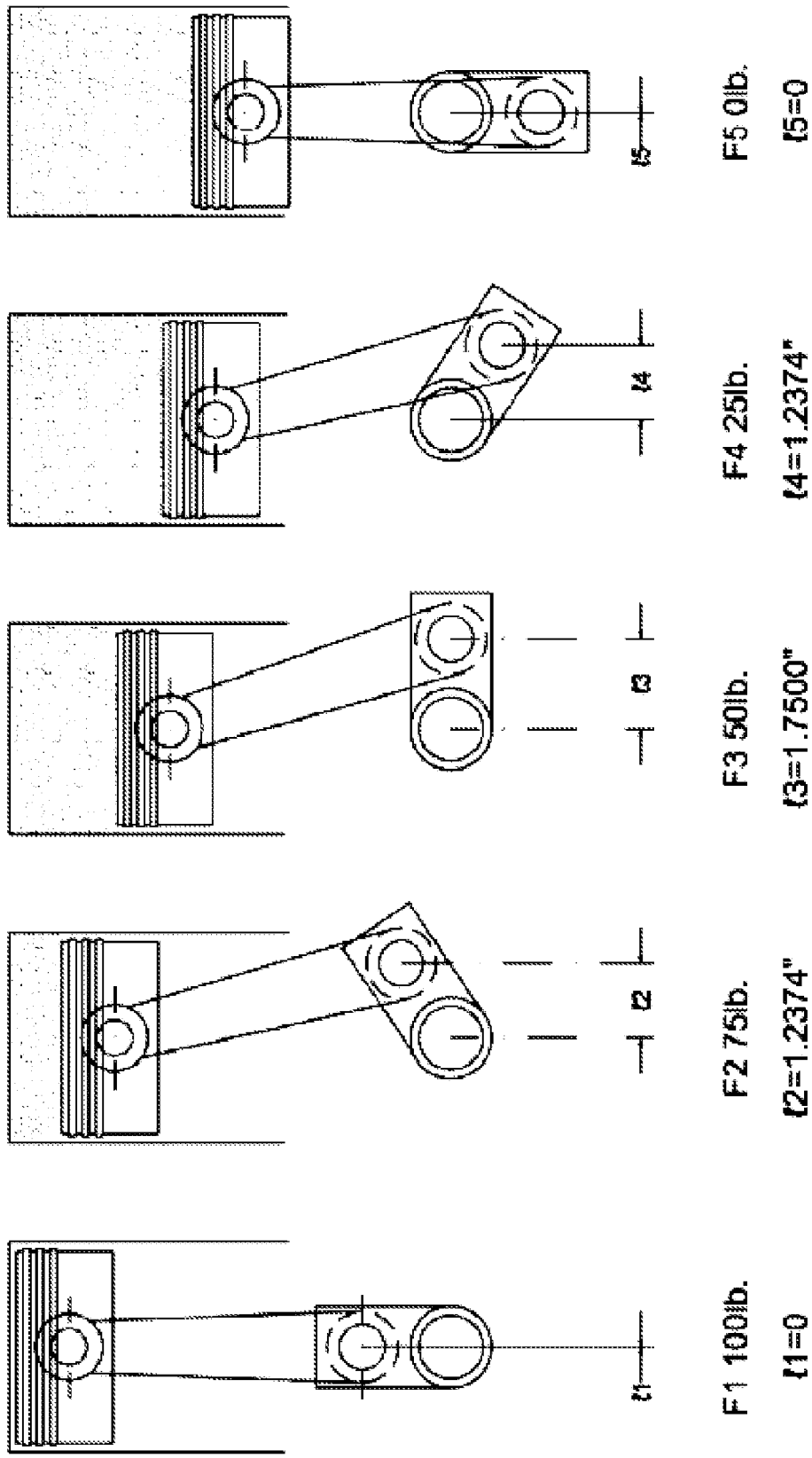
FIG. 13 is a sectional view of a piston-cylinder assembly of a known conventional four stroke engine at five different crankshaft positions.
Figure 14:
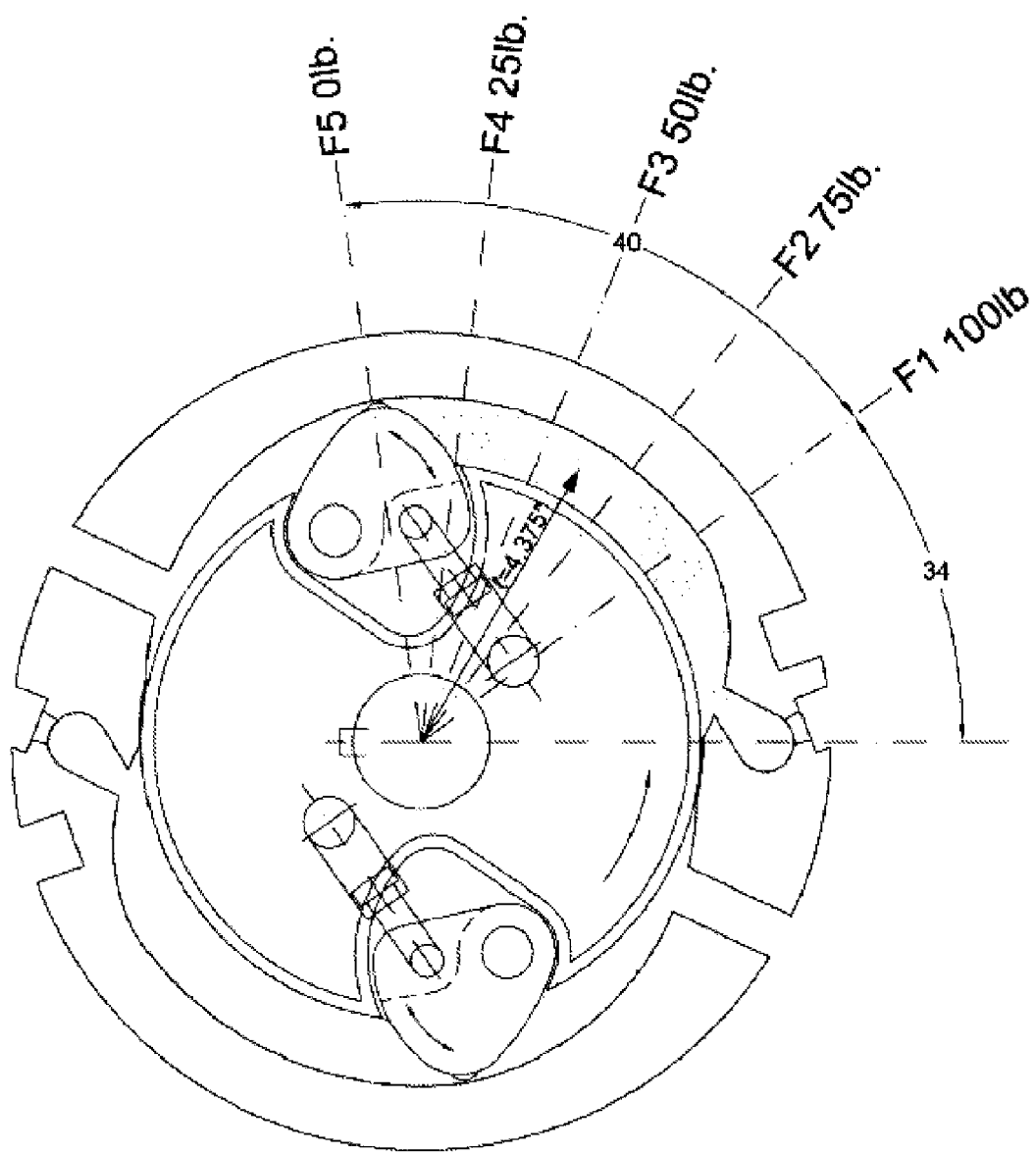
FIG. 14 is a schematic cross sectional view of the turbine assembly of a variable blade turbine internal combustion engine according to an embodiment of the present invention, which illustrates five positions which correspond to the five crankshaft positions shown in FIG. 13.

Calculating Relative Efficiency:

The following calculations shown in Table 1 and Table 2 below, which are conducted for the two combustion engine systems the pistons and rotors of which are illustrated respectively in FIGS. 13 and 14, are provided in order to demonstrate the general theoretical relative efficiency between a conventional four stroke engine and a variable blade turbine engine according to the present invention.

The calculations shown in Tables 1 and 2 assume the same volume of air fuel mixture (80), and the same compression ratio. Force of combustion F is equal to 100% at peak combustion (max. compression) and a value of Fmax=100 lb. is assigned.

Table 1 below shows calculation of forces and torque in a conventional four stroke engine at a 1.750" stroke crankshaft, in five (5) different crankshaft positions. FIG. 13 shows the relative positions of the piston at each of the five (5) points. For the pistons of the conventional four stroke engine shown in FIG. 13, the lever length of the crankshaft relative to the piston center line l1 is variable and changes relative to the crankshaft position. At Max combustion the length l1 is 0, at 90° the lever length l1 is max. at 1.750" or 0.146 feet.

TABLE 1

Torque calculations at five (5) points of conventional four stroke engine.

| Table of l1 length and corresponding torque at (5) positions: | | | | Crankshaft angle |
|---|---|---|---|---|
| 1. F = 100 lb. | l1 = 0 | => torque: 100 × 0.00 = | 0.00 lb.ft. | 00.00° |
| 2. F = 75 lb. | l1 = 1.2374" = 0.1031 feet | => torque: 75 × 0.103 = | 7.73 lb.ft. | 45.00° |
| 3. F = 50 lb. | l1 = 1.7500" = 0.1458 feet | => torque: 50 × 0.146 = | 7.30 lb.ft. | 90.00° |
| 4. F = 25 lb. | l1 = 1.2374" = 0.1031 feet | => torque: 25 × 0.103 = | 2.58 lb.ft. | 135.00° |
| 5. F = 0.0 lb. | l1 = 0 | => torque: 0.0 × 0.00 = | 0.00 lb.ft. | 180.00° |
| Torque Value: | | | 17.61 lb.ft. | |

At 45° and 135° the value of l1 relative to the centerline of the piston is as follows:

Crankshaft stroke => 1.750/Sine90° = l1/sine45° => l1 = 1.750 × sine45°/sine90°l1 = 1.750 × 0.7071/1 = 1.2374"

Table 2 below shows the calculation of forces and torque in a Variable Blade Turbine (VBT) engine according to the present invention in five (5) different corresponding positions. FIG. 14 shows the five (5) corresponding points in the. As shown in FIG. 14, the lever length l2 from combustion to power output shaft is 4.375"=>0.3646 feet and remains constant at 0.3646 feet.

TABLE 2

Torque calculation Variable Blade Turbine at (5) corresponding points.

| | |
|---|---|
| F1max = 100 lb. × 0.3646 feet = | 36.46 lb.ft. |
| F2 = 75 lb × 0.3646 feet = | 27.35 lb.ft. |
| F3 = 50 lb. × 0.3646 feet = | 18.23 lb.ft. |
| F4 = 25 lb. × 0.3646 feet = | 9.11 lf.ft. |
| F5 = 0.00 lb × 0.3646 feet = | 0.00 lf.ft. |
| Torque value | 91.15 lb.ft. |

At Max. Combustion F1max = relative force assign 100 lb.

The relative theoretical torque advantage of VBT over conventional four (4) stroke engine can be determined by the following calculation: 91.15 lb.ft./17.61 lb. ft.=5.176. Thus, the amount of theoretical torque generated by the VBT engine is over five times that of a conventional four stroke engine.

While specific embodiments of the invention have been shown and described in detail to illustrate the application of the principles of the invention, it will be understood that the invention may be embodied otherwise without departing from such principles.

What is claimed is:

1. A combination piston and variable blade turbine internal combustion engine (100) comprising:
   i. a variable blade turbine assembly (T) comprising:
   a front side,
   a back side,
   a hollow stationary turbine housing (12) further comprising:
      a peripheral interior surface (19),
      a cylindrical rotor (5) rotatably provided within the turbine housing (12),
   at least one first variable turbine blade (7),
   at least one second variable turbine blade (8),
   a first gas tight junction (J1),
   a second gas tight junction (J2),
   combustion and exhaust chambers (14),
   a front turbine compression port (17a),
   a back turbine compression port (17b),
   a first transition point (16a),
   a second transition point (16b),
   a front fuel injector (49a),
   a back fuel injector (49b),
   a front spark plug (30a),
   a back spark plug (30b),
   a first exhaust port (23a),
   a second exhaust port (23b), and
   a turbine housing cam contour (18),
      wherein the rotor (5) further comprises:
         a rotational axis (A),
         a first side,
         an opposite second side,
         an outer seal surface (6),
         a first blade shaped notch (72) positioned on the first side of the rotor (5), and
         a second blade shaped notch (73) positioned on the second side of the rotor (5),
      wherein the at least one first variable turbine blade (7) is pivotably connected to the first side of the rotor (5) so that the at least one variable turbine blade (7) swivels both inboard of the rotor (5) into the at least one first variable turbine blade shaped notch (72) and outboard of the rotor (5) in response to a centrifugal force (51),
      wherein the at least one first variable turbine blade (7) includes a first variable blade apex (50a) for engaging the inner surface of the turbine housing (19),
   wherein the at least one second variable turbine blade (8) pivotably connected to the second side of the rotor (5) so that the least one second variable turbine blade (8) swivels both inboard of the rotor (5) into the at least one second variable blade shaped notch (73) and outboard of the rotor (5) in response to a centrifugal force (51),
   wherein the at least one second variable turbine blade (8) includes a second variable blade apex (50b) for engaging the inner surface of the turbine housing (19),
   wherein the first gas tight junction (J1) includes the outer seal surface (6) on the first side of the rotor (5) against the interior surface (19) of the turbine housing (12),
   wherein the second gas tight junction (J2) includes the outer seal surface (6) on the second side of the rotor (5) against the interior surface (19) of the turbine housing (12),
   wherein the combustion and exhaust chambers (14) is defined by the peripheral interior surface (19) of the turbine housing (12) the outer seal surface (6) of the rotor (5), the first variable turbine blade (7) and the second variable turbine blade (8), and
   wherein the combustion and exhaust chambers (14) includes a center point and being flanked by the first gas tight junction (J1) and the second gas tight junction (J2) in which simultaneous power and exhaust strokes (57, 62) take place,
   wherein the front turbine compression port (17a) through which partially compressed air enters the turbine assembly (T), is located immediately downstream from the first gas tight junction (J1),
   wherein the front turbine compression port (17a) further comprises a back end and an outlet through which compressed air enters the combustion chambers (14),
   wherein the back turbine compression port (17b) through which partially compressed air enters the turbine assembly (T), is located immediately downstream from the second gas tight junction (J2),
   wherein the back turbine compression port (17b) further comprises a back end and an outlet through which the compressed air enters the combustion chambers (14),
   wherein the first transition point (16a) on the peripheral interior surface (19) of the turbine housing is positioned immediately downstream from the outlet of the front turbine compression port (17a),
   wherein the second transition point (16b) on the peripheral interior surface (19) of the turbine housing is positioned immediately downstream from the outlet of the back turbine compression port (17b),
   wherein the front fuel injector (49a) for injecting fuel into and creating a fuel air mixture in the combustion and exhaust chambers (14) is located in the turbine housing at a position immediately downstream from the outlet of the front turbine compression port (17a),
   wherein the back fuel injector (49b) for injecting fuel into and creating a fuel air mixture in the combustion and exhaust chambers (14) is located in the turbine housing at a position immediately downstream from the outlet of the back turbine compression port (17b), wherein the front spark plug (30a), for igniting the fuel air mixture in the combustion and exhaust chambers (14) created by the front fuel injector (49a) is positioned at the back end of the front turbine compression port (17a), wherein the back spark plug (30b) for igniting the fuel air mixture in the combustion and exhaust chambers (14) created by the back fuel injector (49b) is positioned at the back end of the back turbine compression port (17b), wherein the first exhaust port (23a) is located upstream of the second gas tight junction (J2) through which exhaust gases leave the turbine assembly (T), wherein the second exhaust port (23b) is located upstream of the first gas tight junction (J1) through which exhaust gases leave the turbine assembly (T), and wherein the turbine housing cam contour (18) for forcing the first variable blade (7) and the second variable blade (8) inboard as the rotor (5) spins, is formed by the interior surface (19) of the turbine housing (12) and located between the first gas tight junction (J1) and the second gas tight junction (J2), wherein the turbine housing cam contour (18) includes a radius from the rotor's axis of rotation (A) which is greatest at the center of the combustion and exhaust chambers (14) and which gradually tappers off toward the first gas tight junction (J1) and the second gas tight junction (J2);

ii. at least one front piston-cylinder assembly (Pa) for feeding compressed air to the turbine assembly (T) comprising:

a front piston housing (15a) connected to the front side of stationary turbine housing (12) of the variable blade turbine assembly (T), a front intake and compression chamber (39) having a top end, a front compression transfer port (44), for transferring partially compressed air to the turbine assembly (T), located at the top end of the front intake and compression chamber (39) and positioned adjacent to the variable blade turbine assembly (T) so that the front compression transfer port is in line with the front turbine compression port (17a), a front compression transfer valve (42a) for opening and closing the front compression transfer port (44), a front air intake and compression piston (27a) which has a bottom surface and which is slidably positioned within the front intake and compression chamber (39), a front connecting rod (29a) pivotably connected to the bottom surface of the front air intake and compression piston (27a), a front air intake port (54a) located at the top end of the front intake and compression chamber (39) through which air is drawn into the front intake and compression chamber (39), and a front air intake valve (55a) for opening and closing the front air intake port (54a); and iii. at least one back piston-cylinder assembly (Pb) for feeding compressed air to the turbine assembly (T), comprising:

a back piston housing (15b), connected to the back side of the stationary turbine housing (12) of the variable blade turbine assembly (T), a back intake and compression chamber (41) having a top end, a back compression transfer port (45), for transferring partially compressed air to the turbine assembly (T), located at the top end of the back intake and compression chamber (41) and positioned adjacent to the variable blade turbine assembly (T) so that the back compression transfer port (45) is in line with the back turbine compression port (17b), a back compression transfer valve (42b) for opening and closing the back compression transfer port (45), a back air intake and compression piston (27b) which has a bottom surface and which is slidably positioned within the back intake and compression chamber (41), a back connecting rod (29b) pivotably connected to the bottom surface of the back air intake and compression piston (27b), a back air intake port (54b) located at the top end of the back intake and compression chamber (41) through which air is drawn into the back intake and compression chamber (41), and a back air intake valve (55b) for opening and closing the back air intake port (54b);

iv. an output shaft (1) for transferring the power created by combustion in the turbine assembly (T) being rotatably supported through the turbine housing (12) and fixed to the rotor (5) so that the rotor (5) and the output shaft (1) rotate at the same rate;

v. a crankshaft (2) for controlling movement of the front intake and compression piston (27a) and the back intake and compression piston (27b), the crankshaft (2) further comprising:

a first crankpin (31) pivotably connected to the front connecting rod (29a), and a second crankpin (32), pivotably connected to the back connecting rod (29b);

vi. a means for synchronizing and mechanically connecting the output shaft (1) to the crankshaft (2) (M), for transferring rotational power from the output shaft (1) to the crankshaft (2) configured so that intake, partial compression, full compression plus combustion and exhaust strokes are properly timed;

vii. a first camshaft (3) comprising:

a front compression cam lobe (43a) located above the front compression transfer valve (42a) for controlling the opening and closing of the front compression transfer valve (42a), and a front intake cam lobe (26a) located above the front air intake valve (55a) for controlling the opening and closing of the front air intake valve (55a);

viii. a second camshaft (4) comprising:

a back compression cam lobe (43b) located above the back compression transfer valve (42b) for controlling the opening and closing of the back compression transfer valve (42b), and a back intake cam lobe (26b) located above the back air intake valve (55b) for controlling the opening and closing of the back air intake valve (55b);

ix. a means for mechanically connecting and synchronizing the output shaft (1) to the first camshaft (3) for transferring rotational power from the output shaft (1) to the first camshaft (3) configured so that the opening and closing of the front air intake valve (55a) and the front compression transfer valve (42a) is timed properly; and x. a means for mechanically connecting and synchronizing the output shaft (1) to the second camshaft (4) for transferring rotational power from the output shaft (1) to the second camshaft (4) configured so that the opening and closing of the back air intake valve (55b) and the back compression transfer valve (42b) is timed properly.

2. The combination piston and variable blade turbine internal combustion engine (100) as claimed in claim 1, wherein per each full rotation of the power output shaft, there are four turbine power strokes with respective exhaust cycles.

3. The combination piston and variable blade turbine internal combustion engine (100) as claimed in claim 1, wherein the means for synchronizing and mechanically connecting the output shaft (1) to the crankshaft (2) (M), is configured with a 2:1 ratio so that there are 2 combustion strokes per each variable blade for every output shaft single rotation.

4. The combination piston and variable blade turbine internal combustion engine (100) as claimed in claim 1, wherein the at least one first turbine blade (7) is pivotably connected to the rotor (5) by a first blade pin (48a), and the at least one second turbine blade (8) is pivotably connected to the rotor (5) by a second blade pin (48b).

5. The combination piston and variable blade turbine internal combustion engine (100) as claimed in claim 1, further comprising:
a first variable blade swivel range control (56a) and a second variable blade swivel range control (56b) limiting the load on the first apex seal (50a) and second apex seal (50b) as well as on the turbine housing cam contour (19) and transferring the combustion power from the first and second variable turbine blades (7, 8) to the rotor (5),
wherein the first variable blade swivel range control (56a) includes a first end connected to the first variable turbine blade (7) and a second end connected to the rotor (5), and
wherein the second variable blade swivel range control (56b) includes a first end connected to the second variable blade (8) and a second end connected to the rotor (5).

6. The combination piston and variable blade turbine internal combustion engine (100) as claimed in claim 1, wherein the stationary turbine housing (12), a front piston-cylinder assembly housing (Pa) and the back piston cylinder housing (Pb) are comprised of a substantially monolithic cast metal or alloy.

7. The combination piston and variable blade turbine internal combustion engine (100) as claimed in claim 1, wherein the front piston-cylinder assembly housing (Pa) and the back piston-cylinder assembly housing (Pb) are fixed to the stationary turbine housing (12).

8. The combination piston and variable blade turbine internal combustion engine (100) as claimed in claim 1, wherein the means for mechanically connecting the output shaft (1) to the crankshaft (2) is comprised of a geartrain or chain drive (G).

9. The combination piston and variable blade turbine internal combustion engine (100) as claimed in claim 8, wherein the geartrain (G) is comprised of:
an output shaft gear (9) fixedly attached to the output shaft, and
a crankshaft gear (11) connected to the crankshaft (2) and an intermediate gear (10) for mechanically connecting the output shaft gear (9) and the crankshaft gear (11).

10. The combination piston and variable blade turbine internal combustion engine (100) as claimed in claim 1, wherein the means for mechanically connecting and synchronizing the output shaft (1) to the first camshaft (3) is comprised of:
a first sprocket assembly (Sa); and
the means for mechanically connecting and synchronizing the output shaft (1) to the second camshaft (4) includes a second sprocket assembly (Sb).

11. The combination piston and variable blade turbine internal combustion engine (100) as claimed in claim 10,
wherein the first sprocket assembly (Sa) further comprises a first camshaft sprocket (13a) fixedly attached to the first camshaft (3), and
a first output shaft sprocket (20a) fixedly attached to the output shaft and a first camshaft drive belt (22a) connected to both the first camshaft sprocket (13a) and the first output shaft sprocket (20a); and
wherein the second sprocket assembly (Sb) comprises:
a second camshaft sprocket (13b) fixedly attached to the second camshaft (4), and
a second output shaft sprocket (20b) fixedly attached to the output shaft and a second camshaft drive belt (22b) connected to both the second camshaft sprocket (13b) and the second output shaft sprocket (20b).

12. The combination piston and variable blade turbine internal combustion engine (100) as claimed in claim 1, wherein per each full rotation of the power output shaft, there are two rotations of the crankshaft and two intake and compression cycle per piston, for total of four per rotation.

13. The combination piston and variable blade turbine internal combustion engine (100) as claimed in claim 1, wherein the hollow stationary turbine housing (12) internal cam contour (18, 19) of the combustion and exhaust cycles is defined by three distinct radiuses, per each hemisphere, blended together, including:
a radius R1 being smallest and defining the compression space (34),
a radius R2 being largest and defining a combustion and power cycle (35) and is centered at the centerline of the power output shaft (1), and a radius R3 (36) being sized between radius R1 and radius R2 that tapers down to conclude the exhaust cycle (36).

14. The combination piston and variable blade turbine internal combustion engine (100) as claimed in claim 1, wherein the hollow stationary turbine housing (12) internal cam contour (18, 19) of the combustion and exhaust cycles resembles a figure eight configuration.

15. The combination piston and variable blade turbine internal combustion engine (100) as claimed in claim 1, wherein the front intake and compression piston and the back intake and compression piston (27a, 27b) and front intake and compression chamber and the back intake and compression chamber (39, 41) are angled in a V shape from the centerline of the crankshaft (2) toward the centerline of the front turbine compression transfer port and the back turbine compression transfer port (17a, 17b).

16. The combination piston and variable blade turbine internal combustion engine (100) as claimed in claim 1, wherein the centerline of the power output shaft (1) and the crankshaft (2), are aligned.

17. The combination piston and variable blade turbine internal combustion engine (100) as claimed in claim 1, wherein the front intake and compression piston and the back intake and compression piston (27a, 27b) partly compress (39) the air intake in front intake and compression chamber and the back intake and compression chamber (39, 41) and fully compress the air intake in a turbine chamber via the front turbine compression transfer port and the back turbine compression transfer port (17a, 17b).

18. The combination piston and variable blade turbine internal combustion engine (100) as claimed in claim 1, wherein the front intake and compression piston and the back intake and compression piston (27a, 27b) are constantly performing intake cycle, partial compression cycle (25) and full compression cycle, while simultaneously the rotor (5) and the at least one first variable turbine blade (7) and the at least one second variable turbine blade (8) are performing power and combustion stroke and exhaust stroke.

19. The combination piston and variable blade internal combustion engine (100), as claimed in claim 1, wherein spinning of the rotor (5) exerts the centrifugal force (51) on the at least one first variable turbine blade (7) and the at least one second variable turbine blade (8), and forcing said at least one first variable turbine blade (7) and said at least one second variable turbine blade (8) out-boardly of the first blade shaped notch and second blade shaped notch (72, 73) swiveling on the first blade pin and the second blade pin (48a, 48b), toward the engine casing cam contour (19).

20. The combination piston variable blade internal combustion engine (100), as claimed in claim 1, wherein the front turbine compression port (17a), the back turbine compression port (17b), and the front compression transfer port (44) extends from the front piston-cylinder assembly (Pa) and the back piston-cylinder assembly (Pb) to the hollow stationary turbine housing (12).

21. The combination piston variable blade internal combustion engine (100), as claimed in claim 1, wherein the front compression transfer valve (42a) and the back compression transfer valve (42b) that are closed in an air intake mode (24) and partial compression mode (25), and open to allow partial compressed air (25) from the front piston-cylinder assembly (Pa) and the back piston-cylinder assembly (Pb) to the combustion exhaust chamber (14), allowing subsequently for full compression of air and fuel mixture (80) on the front intake and compression and the back intake and compression piston (27a, 27b), upward movements, and then the front compression transfer valve (42a) and the back compression transfer valve (42b) are in close positions again to accommodate the turbine combustion cycle and a next air intake cycle.

22. The combination piston variable blade internal combustion engine (100), as claimed in claim 1, wherein the at least one first variable turbine blade (7) and the at least one second variable turbine blade (8) are subject to the centrifugal force (51), outwardly past the first and second air tight junctions (J1, J2) and simultaneously compression forces passing the first and second air tight junctions (J1, J2) and are fully extended at a combustion point.

23. The combination piston variable blade internal combustion engine (100), as claimed in claim 1, wherein the at least one first variable turbine blade (7) and the at least one second variable turbine blade (8) are fully extended at each combustion cycle (35) and are subjected to a combustion force rotation in counterclockwise (60) of a power cycle.

24. The combination piston variable blade internal combustion engine (100), as claimed in claim 1, wherein the at least one first variable turbine blade (7) and the at least one second variable turbine blade (8) while fully extended are forced by the combustion force (61) to create rotor motion in counterclockwise (60) and produce rotational power output at the power output shaft (1).

25. The combination piston variable blade internal combustion engine (100), as claimed in claim 1, wherein the at least one first variable turbine blade (7) and the at least one second variable turbine blade (8) discharge exhaust gases through the first exhaust port (23a) and the second exhaust port (23b) by the centrifugal force, the combustion force, and an inertial force.

\* \* \* \* \*